United States Patent [19]
Ichikawa et al.

[11] Patent Number: 5,901,791
[45] Date of Patent: May 11, 1999

[54] WORKING VEHICLE

[75] Inventors: Katsuhisa Ichikawa; Masakatsu Kono; Kazunari Iriki; Tsuyoshi Kawabata; Kenji Kuroiwa; Tsutomu Inui, all of Wako, Japan

[73] Assignee: Honda Giken Kogyo Kabushiki Kaisha, Tokyo, Japan

[21] Appl. No.: 08/964,463

[22] Filed: Nov. 4, 1997

Related U.S. Application Data

[63] Continuation of application No. 08/446,885, May 17, 1995, abandoned.

[30] Foreign Application Priority Data

| May 17, 1994 | [JP] | Japan | 6-103128 |
| Apr. 24, 1995 | [JP] | Japan | 7-098994 |

[51] Int. Cl.⁶ .......................... A01B 33/00; B60K 17/28
[52] U.S. Cl. .......................... 172/74; 172/79; 172/125; 172/315; 172/431; 172/684.5; 180/11
[58] Field of Search .......................... 172/125, 272, 172/684.5, 315, 321, 75, 74, 79, 175, 828, 318, 431; 180/11

[56] References Cited

U.S. PATENT DOCUMENTS

| 1,673,298 | 6/1928 | O'Connor | 172/684.5 |
| 1,775,314 | 9/1930 | Mahoney et al. | 172/684.5 X |
| 1,986,146 | 1/1935 | Gustafson | 172/315 X |
| 2,058,964 | 10/1936 | Dufour | 172/315 X |
| 2,306,902 | 12/1942 | Rabe | 172/75 |
| 3,110,275 | 11/1963 | Bonney | 172/75 X |
| 3,198,276 | 8/1965 | Gordon | 180/11 |
| 3,941,193 | 3/1976 | Shoemaker | 172/315 X |
| 4,831,891 | 5/1989 | Kato et al. | 172/75 X |
| 4,860,540 | 8/1989 | Hayashi et al. | |
| 5,018,587 | 5/1991 | Gandrud et al. | 172/684.5 X |
| 5,076,370 | 12/1991 | Stubben et al. | 172/684.5 X |
| 5,289,880 | 3/1994 | Barto | 172/684.5 X |

FOREIGN PATENT DOCUMENTS

| 868668 | 1/1942 | France . |
| 1111708 | 3/1956 | France . |
| 2098950 | 3/1972 | France . |
| 2 418 738 | 9/1979 | France . |
| 841964 | 4/1952 | Germany . |
| 855336 | 9/1952 | Germany . |
| 875421 | 3/1953 | Germany . |
| 1 024 280 | 2/1958 | Germany . |
| 568795 | 11/1957 | Italy | 172/315 |
| 627458 | 11/1961 | Italy | 172/684.5 |
| 655486 | 7/1951 | United Kingdom . |
| 990482 | 4/1965 | United Kingdom . |

OTHER PUBLICATIONS

Patent Abstracts of Japan, 59 059577, Apr. 5, 1984.

*Primary Examiner*—Christopher J. Novosad
*Attorney, Agent, or Firm*—Nikaido, Marmelstein, Murray & Oram LLP

[57] ABSTRACT

A working vehicle includes an engine in the rear of a passenger seat, and a working machine vertically movably disposed in the rear of the engine, wherein an upper end of the working machine which is lifted to the highest position is set lower than an upper end of the engine. As a result, a ventilation in the vicinity of the engine is improved and a cooling effect of the engine is enhanced. Also, a maintenance of the engine can be conducted without being interfered by the working machine. Further, with this arrangement, a center of gravity of the working machine is low, thereby enhancing a stability of the working vehicle, and a driver or a passenger of the vehicle can visually check backward much easier.

4 Claims, 18 Drawing Sheets

WORKING VEHICLE

This application is a continuation of application Ser. No. 08/446,885 filed May 17, 1995 now abandoned.

BACKGROUND OF THE INVENTION

1. Filed of the Invention

The present invention relates to a working vehicle in which a working machine is vertically movably disposed at a rear portion of a vehicle frame.

2. Description of Prior Art

A rotary working machine connected to a rear portion of a working vehicle is pivotaly supported through a working machine-lifting/lowering shaft laterally disposed at rear portion of the vehicle, such that the rotary working machine can be lifted upward when the working vehicle travels on a road or when the working vehicle turns during tilling. The working machine-lifting/lowering shaft also functions as a power transmitting shaft for transmitting a driving force of an engine mounted on the vehicle to the rotary working machine, so that even if a lifting or lowering position of the rotary working machine is varied, a power can be transmitted without any problem.

In such a working vehicle, if the engine is disposed between a passenger seat provided at substantially central portion of the vehicle and the working machine provided at a rear portion of the vehicle, front and rear portions of the engine is blocked by the seat and the working machine when the working machine is lifted. The disadvantageously deteriorates a ventilation and thus, a cooling effect of the engine. Further, when a maintenance of the engine is conducted, the lifted working machine becomes a disturbance for such maintenance.

On the other hand, if the rotary working machine is connected to the working vehicle at a location largely separated rearwardly from the rear portion of the vehicle body, when the rotary working machine is lifted, there are problems that a load applied to the vehicle frame is increased, the vehicle can not turn sharply, and a followability of the working machine with respect to the vehicle body is deteriorated and thus, the working efficiency is lowered.

SUMMARY OF THE INVENTION

The present invention is accomplished in view of the above circumstances, and it is a first object of the invention to prevent a cooling effect of the engine and a maintenancebility of the engine from being deteriorated when the working machine mounted at a tear portion of the working vehicle is lifted.

Further, it is a second object of the invention to connect the working machine to a rear portion of the working vehicle through a working machine-lifting/lowering shaft in a compact structure.

To achieve the first object, according to the inventions there is proposed a working vehicle comprising:

a seat disposed substantially at a central portion of a vehicle frame; a working machine vertically movably disposed at a rear portion of the vehicle frame; and an engine disposed between the seat and the working machine; wherein an upper end of the working machine when lifted to a highest position is set lower than an upper end of the engine.

With this arrangement, it is possible not only to improve a ventilation in the vicinity of the engine to enhance a cooling effect of the engine, but also to conduct a maintenance of the engine without being interfered by the working machine. Further, since a center of gravity of the working machine is lower, a stability of the vehicle is improved, and a driver or a passenger of the vehicle can visually check backward much easier.

To achieve the second object, according to the invention, there is proposed a working vehicle comprising: a working machine-lifting/lowering shaft extended laterally of a vehicle body and rotatably supported on a rear portion of a vehicle frame in which an engine is mounted; and a working machine vertically movably connected to the vehicle frame through the working machine-lifting/lowering shaft, a driving force of the engine being transmitted to the working machine through the working machine-lifting/lowering shaft, wherein a cylinder of the engine is inclined rearwardly and upwardly so as to extend rearwardly from a rear end of the vehicle frame, the working machine-lifting/lowering shaft being disposed below the cylinder as viewed on a side plane.

With the above arrangement, a waste space in the rear of the vehicle frame can effectively used so that the working machine can be disposed near the vehicle body. Therefore, a moment transmitted from the working machine to the vehicle frame is reduced and thus, a reinforcement of the vehicle body becomes unnecessary and it is possible to reduce a weight of the vehicle body. Further, since the entire length of the vehicle is reduced, a followability of the working machine with respect to the vehicle body is enhanced, and it is possible to improve a turning property and stability. As a result, in a rotary working machine, a head land can easily be tilled so that uncultivated area can be reduced.

In addition to the above arrangement, there is proposed a working vehicle further including a transmission system mounted in the vehicle frame for transmitting a driving force of the engine to left and right driven wheels, the transmission system including a speed reduction device and a static hydraulic pressure type continuously variable transmission provided with a hydraulic pump and a hydraulic motor, the transmission system being disposed within a projection area of the driven wheel as viewed on a side plane. With this arrangement, it is possible not only to effectively used a waste space in the vicinity of an axle of the driven wheels, but also to locate a center of gravity of the transmission in the vicinity of the axle so as to enhance the working stability.

Further, if the transmission system is provided with the hydraulic pressure pump, the hydraulic pressure motor and the speed reduction device sequentially from front to rear of the vehicle body, it is possible to reduce a vertical size of the transmission to sufficiently secure the minimum height from the ground, and to reliably prevent the vehicle body from sticking.

Further, if the engine is disposed at an upper portion of the transmission system, a position of the engine is lowered to lower the center of the gravity of the vehicle body, which further enhance the working stability.

Furthermore, there is proposed a working vehicle, comprising; a transmission system including a static hydraulic pressure type continuously variable transmission; a speed change operating device for controlling speed change characteristics of the static hydraulic pressure type continuously variable transmissions; a speed change control member provided in the speed change operating device; and another speed change control member provided in the transmission system, the speed change control members being connected together by a link member; the transmission system and the speed change operating device being mounted to the vehicle frame; wherein the speed change operating device is disposed in a lower portion of a seat provided at a subsantially central portion of a vehicle body in both longitudinal and lateral directions, the transmission system is disposed in a rear of the speed change operating device at a position substantially centrally in the lateral direction of the vehicle body, and the link member is disposed substantially along the longitudinal direction of the vehicle body.

The above and other objects, features and advantages of the invention will become apparent from a preferred embodiment taken in conjunction with the accompanying drawings.

DESCRIPTION OF THE PREFERRED EMBODIMENTS

Figure 1:
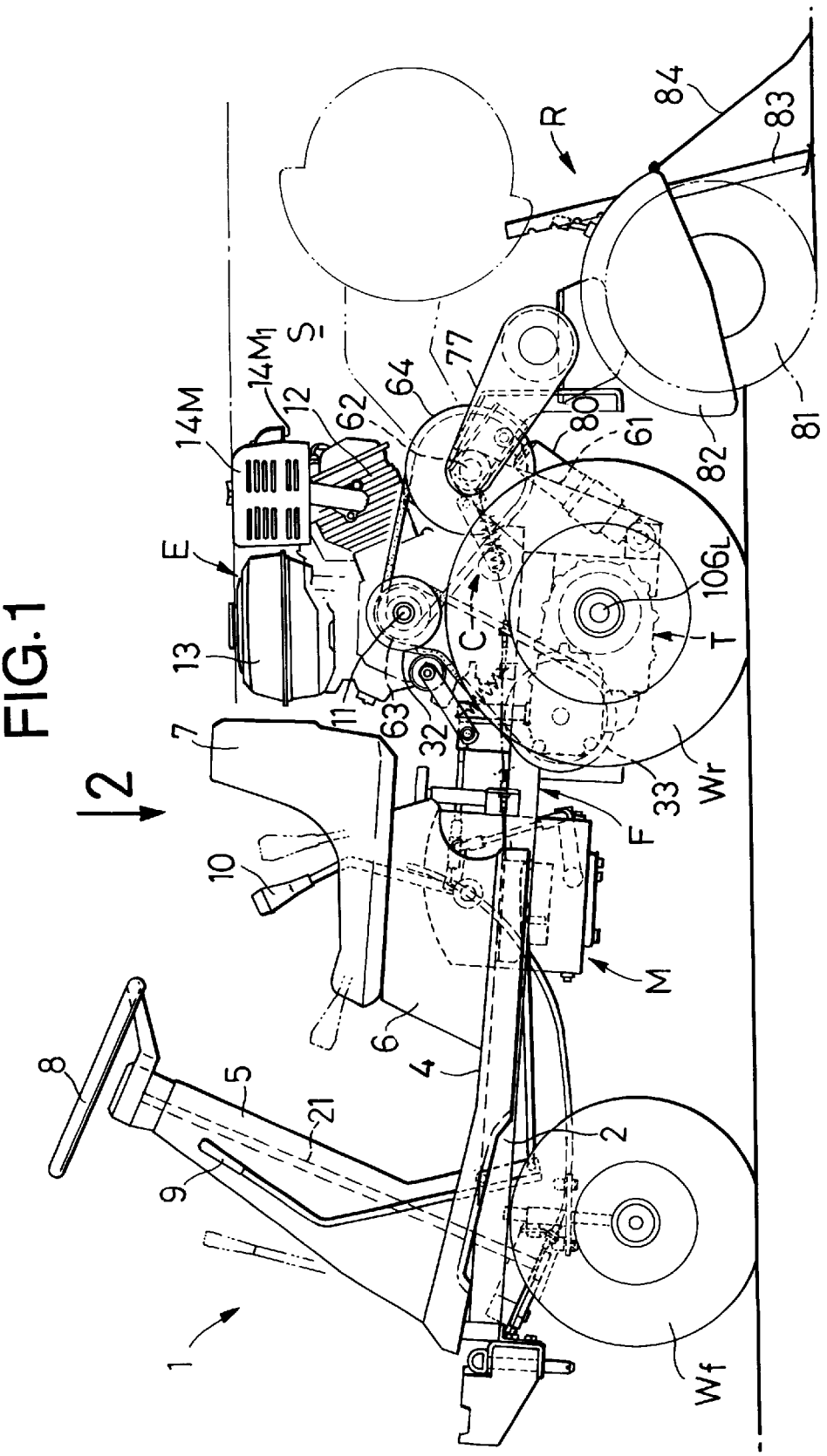
FIG. 1 is a side view of an entire working vehicle.
Figure 2:
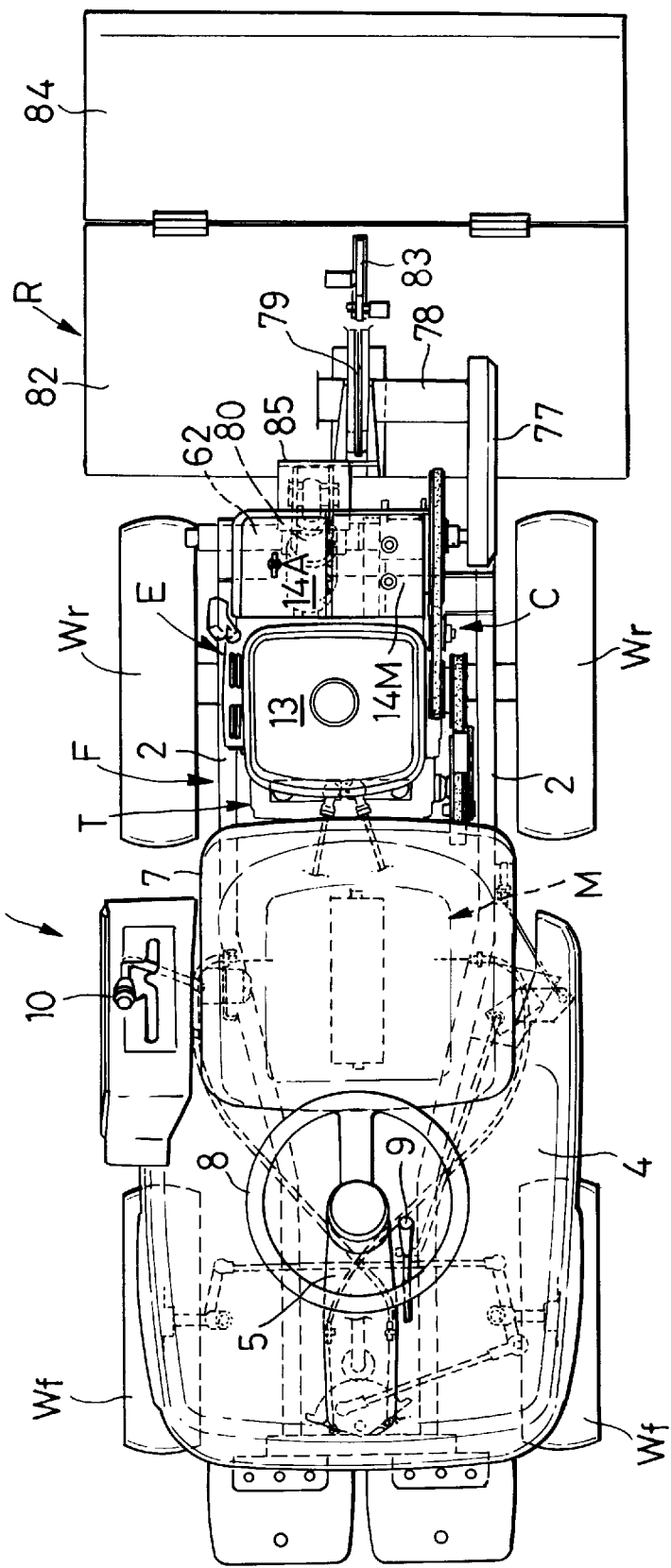
FIG. 2 is a view taken along an arrow 2 in FIG. 1.

As shown in FIG. 1 and FIG. 2, a riding type working vehicle 1 having a pair of right and left front wheels Wf as follower wheels and a pair of right and left rear wheels Wr as driven wheels has a vehicle body frame F including a pair of right and left side frames 2, 2 extending in the longitudinal direction of the vehicle body, and five cross frames $3_1$ to $3_5$ extending in the lateral direction of the vehicle body for connecting both the side frames 2, 2. A floor panel 4, a steering wheel post 5, and a seat base 6 are mounted to a front portion of the vehicle body frame F. A seat 7 on which a passenger sits is provided on the seat base 6. The steering wheel post 5 is provided at its upper portion with a steering wheel 8 for steering the right and left front wheels wf, and generating a difference in rotating speed in the right and left rear wheels Wr through a hydrostatic continuously variable transmission described later. At the left side of the steering wheel post 5, there is provided a clutch lever 9 for turning on or off the tension clutch which controls power transmission to the working machine (which will be described later), and at the right side of the seat 7, a change lever 10 is provided for moving the working vehicle 1 back and forth.

The steering wheel 8 constitutes the steering angle setting means, and the change lever 10 constitutes the vehicle speed setting means of the invention.

A single-cylinder four-cycle engine E is mounted on the upper surface of the rear portion of the vehicle body, such that a crankshaft 11 of the engine E is directed to the lateral direction of the vehicle body, and a cylinder 12 is directed upwardly and rearwardly. On upper portion of the engine E, a fuel tank 13, an air cleaner 14A, and a muffler 14M are supported. In a lower portion of the engine E, a transmission system T for converting the driving force of the engine 3 into a hydraulic pressure and driving the right and left rear wheels Wr is mounted. A speed change operating device M installed beneath the seat 7 mixes the operation of the steering wheel 8 and operation of change lever 10 and transmits it to the transmission system T so as to control the rotating speed of the right and left rear wheels Wr independently. A rotary working machine R driven by the engine E is connected to a rear end of the vehicle body.

Figure 3:
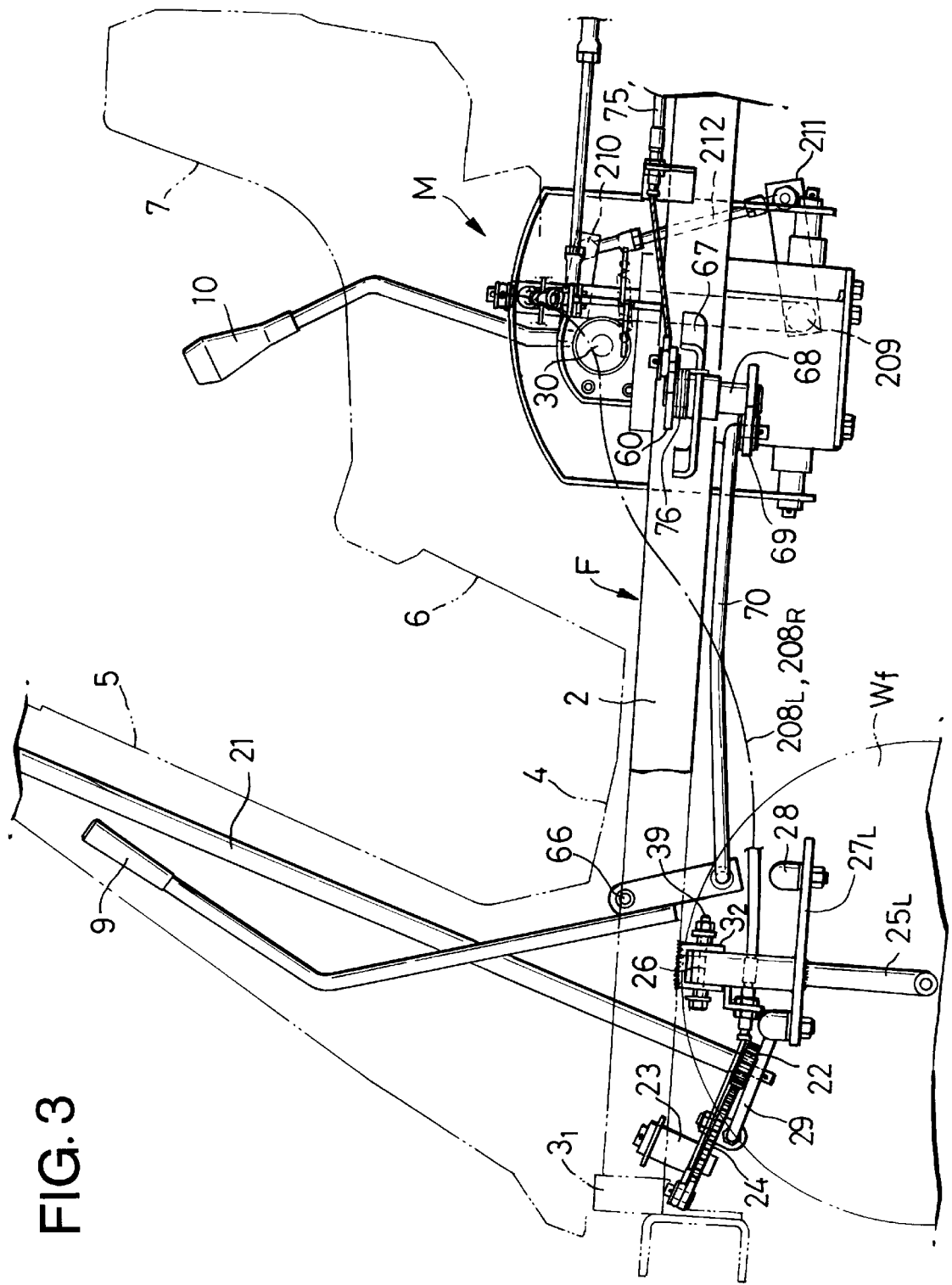
FIG. 3 is an enlarged view of an essential portion FIG. 1.
Figure 5:
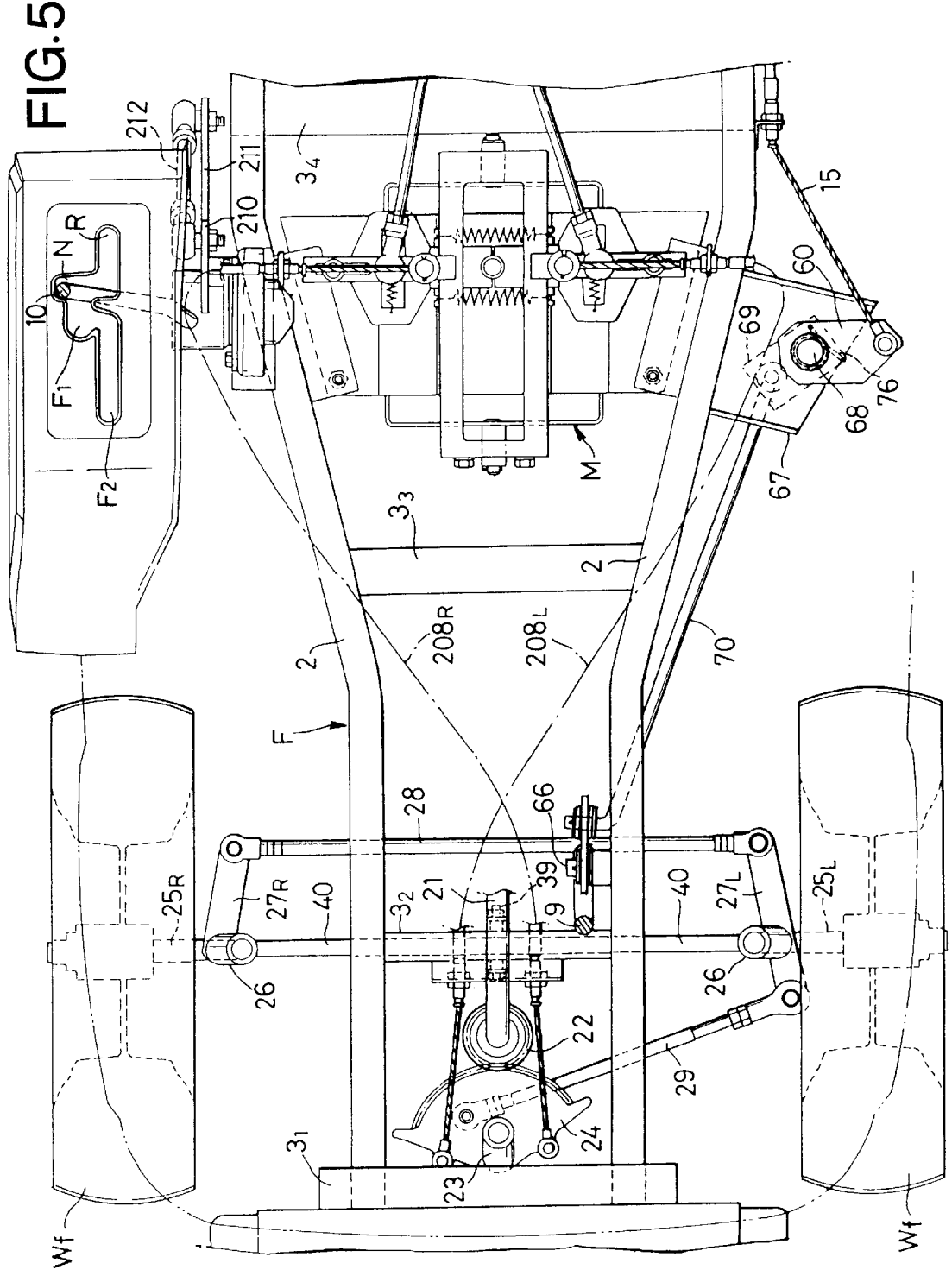
FIG. 5 is an enlarged view of an essential portion FIG. 2.

As clear from FIG. 3 and FIG. 5, a gear 22 is secured to the lower end of a steering shaft 21 connected to the steering wheel 8, and a sector gear 24 pivotally supported by a pivot 23 is engaged with the gear 22. Right and left knuckles $25_R$, $25_L$, for pivotally supporting the right and left front wheels Wf are shaped in an L-form, and are supported so as to be free to swivel on guide tubes 26, 26 provided at right and left ends of a plate 40 laterally swingably pivoted on the lower part of the cross frame 32 through a stepped bolt 39. Right and left knuckle arms $27_R$, $27_L$ secured respectively to the knuckles $25_R$, $25_L$ are mutually connected through a tie rod 28, and the left knuckle arm $27_L$ and sector gear 24 are mutually connected through a steering rod 29.

When the steering wheel 8 is operated, the left front wheel Wf is steered through the steering shaft 21, gear 22, sector gear 24, steering rod 29, left knuckle arm $27_L$, and left knuckle $25_L$, and further the right front wheel Wf is steered from the left-side knuckle arm $27_L$ through the tie rod 28, right knuckle arm $27_R$ and right knuckle $25_R$. The maximum steering angle of the steering wheel 8 is 200° each clockwise and counterclockwise, and it is set so that the steering angle of the outer front wheel Wf during turning is 50° when the steering angle is 200°.

Figure 4:
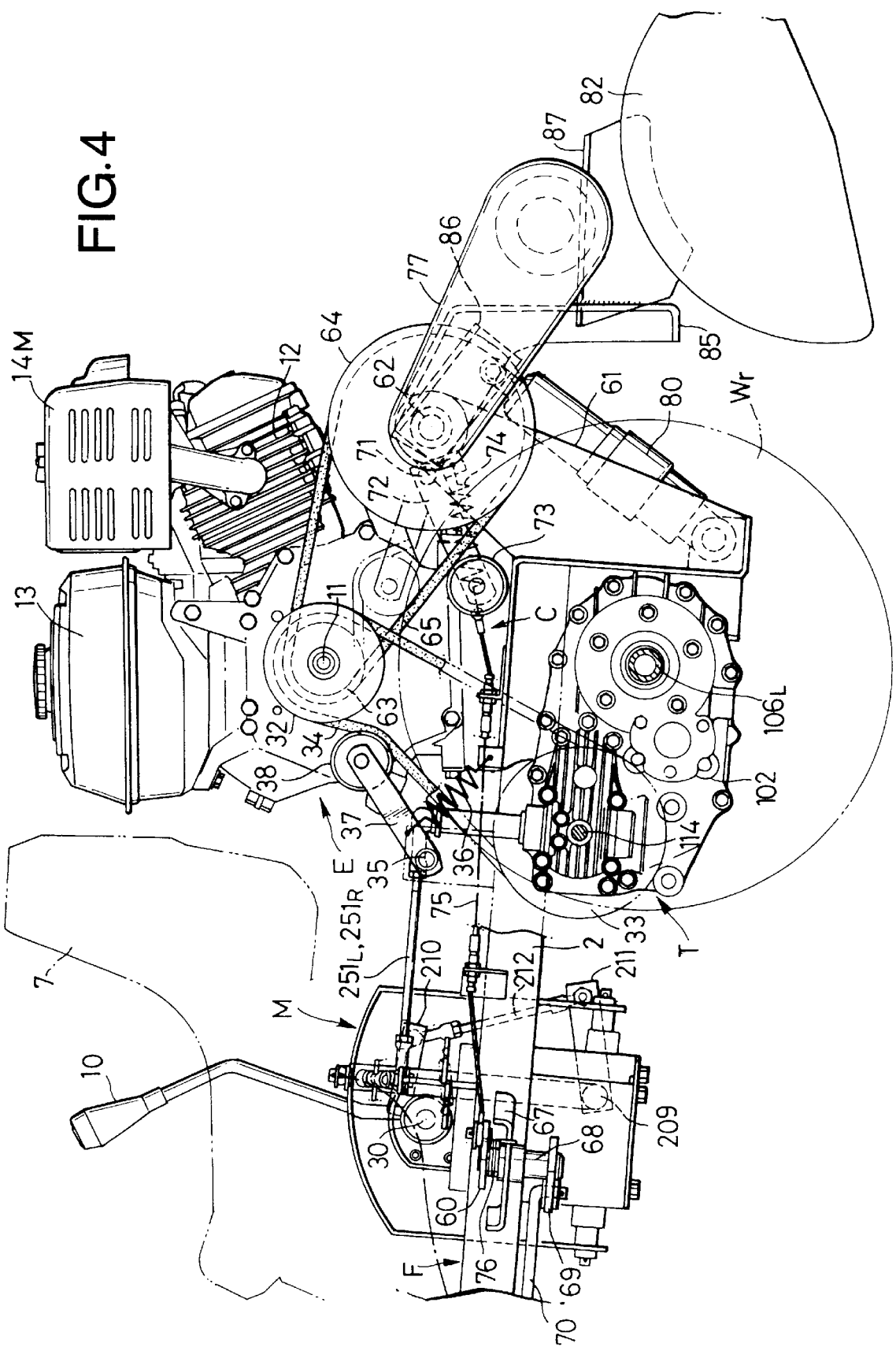
FIG. 4 is an enlarged view of an essential portion FIG. 1.
Figure 6:
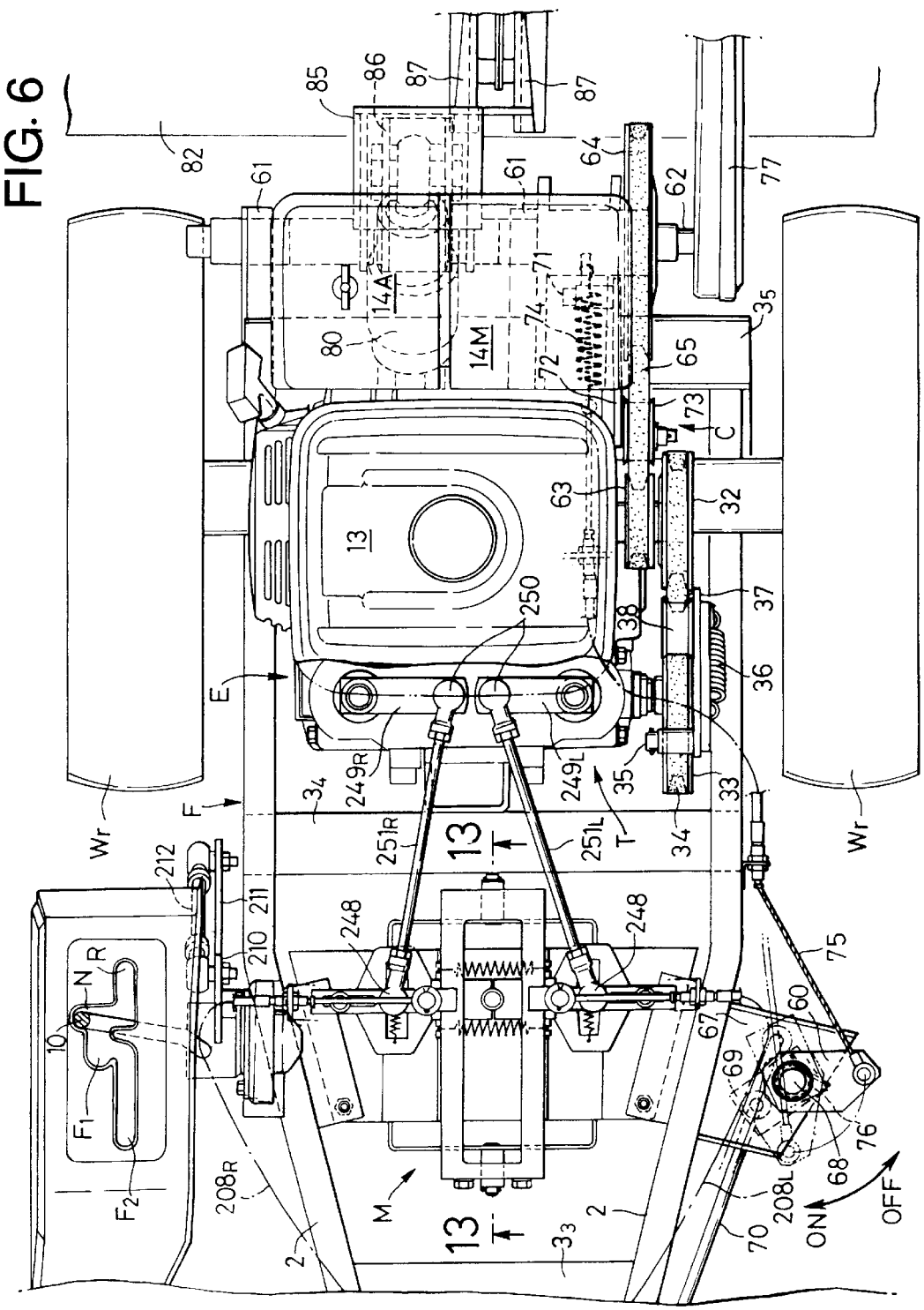
FIG. 6 is an enlarged view of an essential portion FIG. 2.

As clear from FIG. 4 and FIG. 6, the change lever 10 is pivoted for swinging movement longitudinally and laterally through a pivot 30 extending in the lateral direction of the vehicle body. When the change lever 10 is at neutral position N, the working vehicle 1 is stopped, and when the change lever 10 is swung forward from the neutral position, the working vehicle 1 begins to run forward at 0 km/h to +7.5 km/h. When the forward swing angle is 14°, the change lever 10 is at the working top position $F_1$, and the vehicle speed is +2.5 km/h. When the forward swing angle is 42°, the change lever 10 is at the traveling top position $F_2$, and the vehicle speed is +7.5 km/h. When the change lever 10 is swung backward from the neutral position, the working vehicle 1 begins to run backward at 0 km/h to –3.5 km/h, and at the backward swing angle of 20°, the change lever 10 is at the reverse top position R, and the vehicle speed is –3.5 km/h.

The maximum vehicle speed in forward running of +7.5 km/h, and the maximum vehicle speed in reverse running of –3.5 km/h can be changed arbitrarily, and the maximum vehicle speed in forward running and reverse running may be set, for example, slower than the above values.

Referring then to FIGS. 7 to 12, the structure of the transmission system T for transmitting the driving force of the engine E to the right and left rear wheels Wr is described below.

Figure 7:
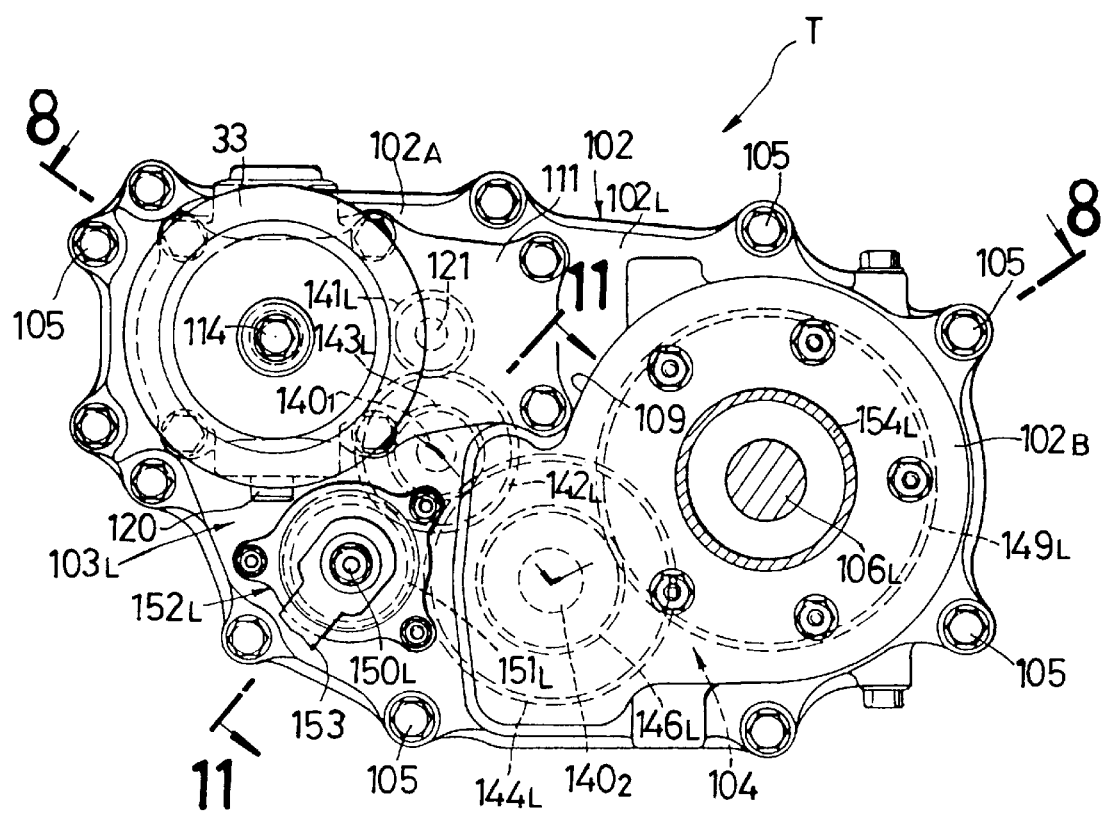
FIG. 7 is an enlarged view of an essential portion FIG. 4.
Figure 8:
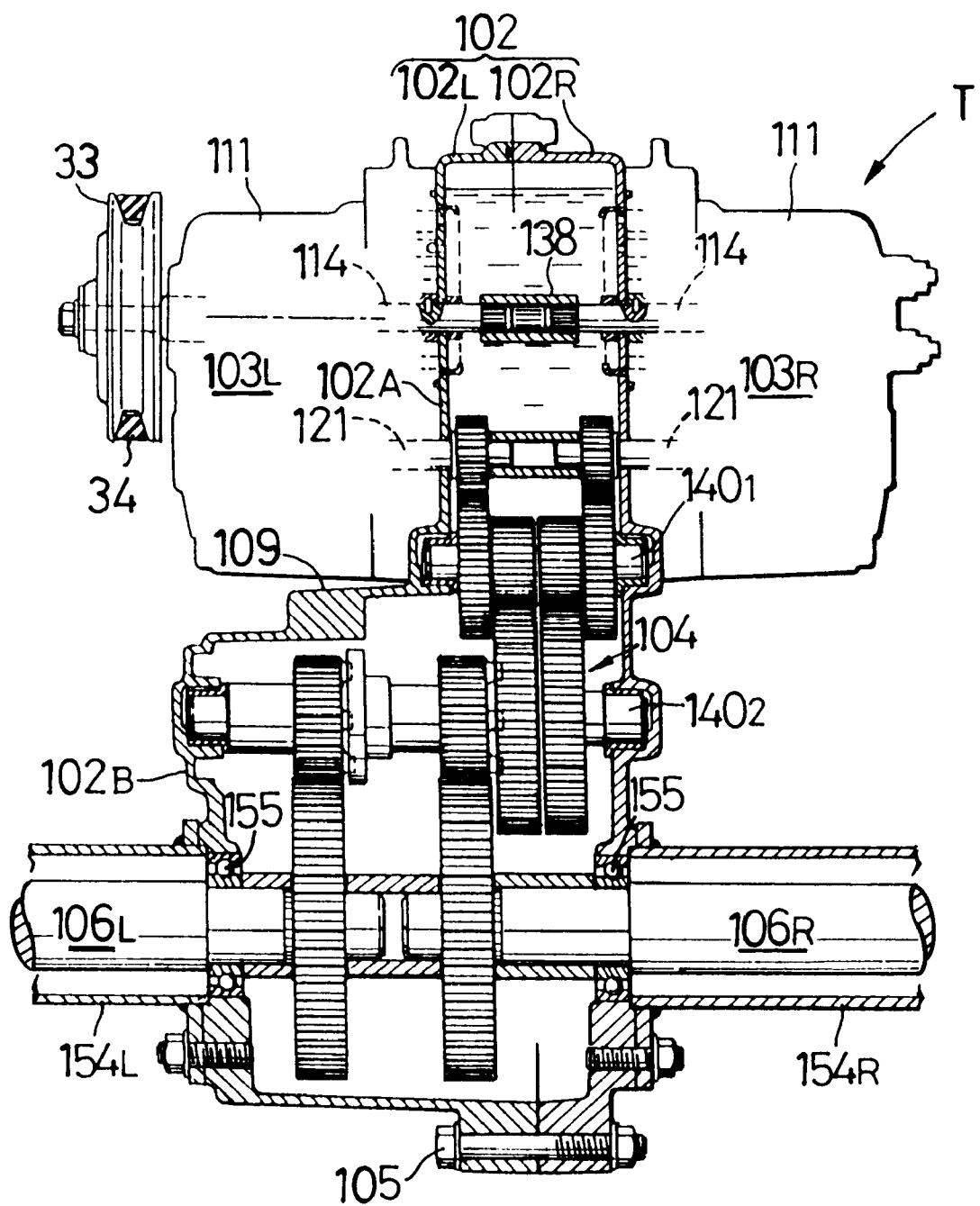
FIG. 8 is a sectional view taken along a line 8—8 in FIG. 7.

In FIGS. 7 and 8, the transmission system T includes a transmission case 102, a pair of static hydrostatic hydraulic continuously variable transmissions $103_R$, $103_L$ provided on the right and left sides of the transmission case 102 respectively, a speed reduction device 104 disposed in the transmission case 102, and a pair of axles $106_R$, $106_L$ penetrating through right and left side walls of the transmission case 102 respectively, and right and left rear wheels Wr are provided at outer ends of these axles $106_R$, $106_L$.

The transmission case 102 is formed by joining open ends of right case half $102_R$ and left case half $102_L$ split on a plane orthogonal to the axis of the axles $106_R$, $106_L$, separably through bolts 105. A lower half of outer side of the left case half $102_L$ is more projected than an upper half thereof, so as to form a step 109 therebetween. Whereas the right case half $102_R$ is formed generally flat on the outer side surface. In this way, the transmission case 102 has a narrow portion $102_A$ above the step 109 and a wide portion $102_B$ below the step 109, and a pair of hydrostatic pressure type continuously variable transmissions $103_R$, $103_L$ are provided on the right and left sides of the narrow portion $102_A$.

The right and left axles $106_R$, $106_L$ are supported within cylindrical axle cases $154_R$, $154_L$ by bearings 155, 155 mounted on right and left side walls of the wide portion $102_B$ of the transmission case 102.

Figure 9:
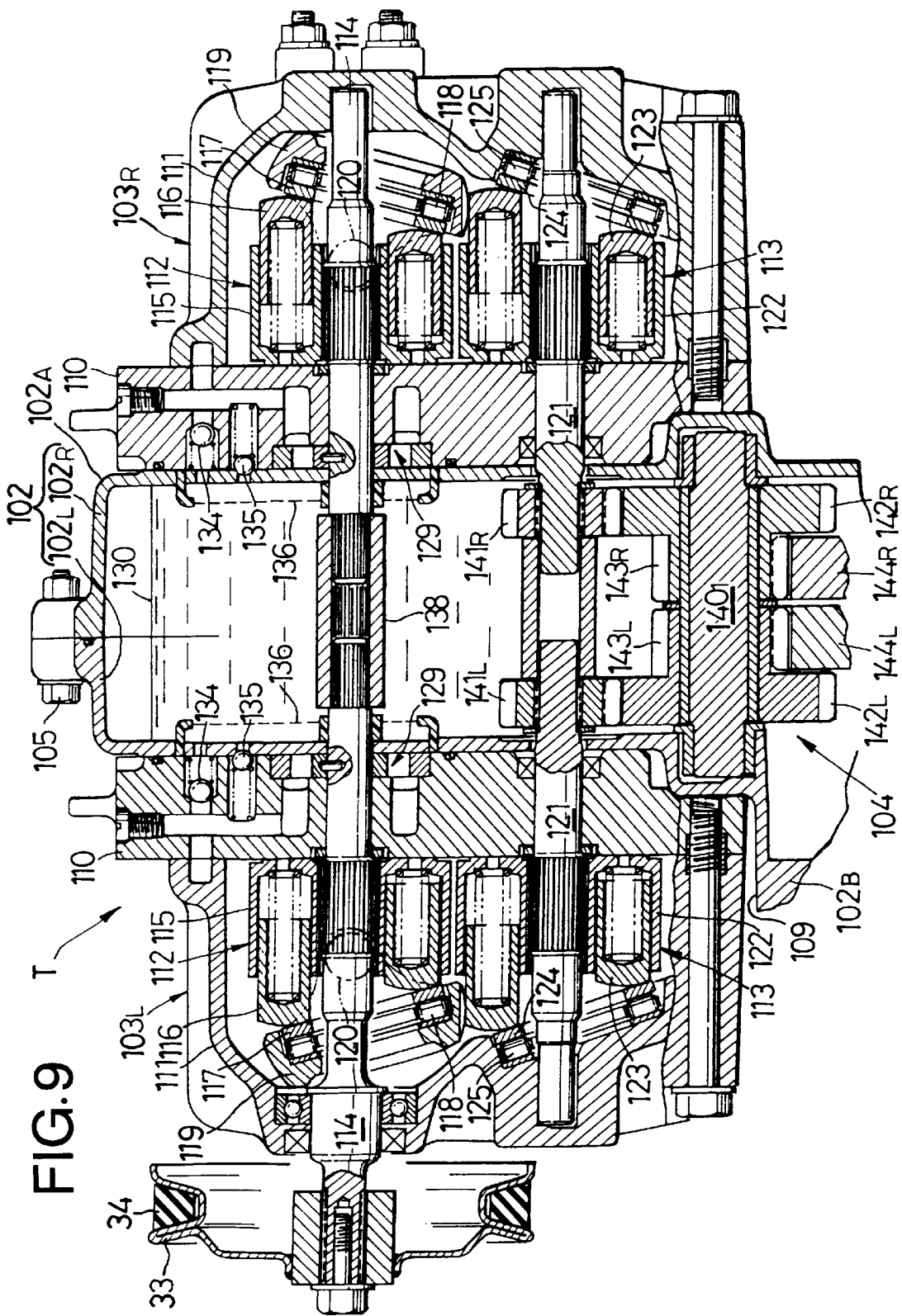
FIG. 9 is an enlarged view of an essential portion FIG. 8.

As shown in FIGS. 7 and 9, right and left hydrostatic pressure type continuously variable transmissions $103_R$, $103_L$ are identical in structure, and disposed symmetrically. Each of the hydrostatic pressure type continuously variable transmissions $103_R$, $103_L$ includes a distribution plate 110 bolted separately to the outer side of the case halves $102_R$, $102_L$ of the same side, a housing 111 bolted to this distribution plate 110, and a hydraulic pump 112 and a hydraulic motor 113 disposed in the housing 111. The hydraulic pump 112 includes a pump shaft 114 penetrating through the distribution plate 110, pump cylinders 115 spline-coupled to the pump shaft 114 and slidably and rotatable connected closely with the distribution plate 110, multiple pump plungers 116 slidably fitted to the pump cylinders 115 in an annular arrangement surrounding the pump shaft 114, a pump swash plate 117 abutting against outer ends of these pump plungers 116, and a swash plate holder 119 for bearing its back side with a thrust bearing 118, and the swash plate holder 119 is supported on the housing 111 through a pair of trunnion shafts 120 of which axis is orthogonal to the axis of the pump shaft 114, and the pump swash plate 117 is tilted between one maximum inclination position (forward top position) and other maximum inclination position (reverse top position) through an erect position (neutral position) orthogonal to the pump shaft 114. At the outer ends of the trunnion shafts 120 of the right and left swash plate holders 119, speed change arms $249_R$, $249_L$ (speed change control) are secured, and by turning these speed change arms $249_R$, $249_L$, the angle of each swash plate 117 can be adjusted.

On the other hand, the hydraulic motor 113 includes a motor shaft 121 penetrating through the distribution plate 110, motor cylinders 122 spline-coupled with the motor shaft 121 and slidably and rotatably connected closely with the distribution plate 110, a large number of motor plungers 123 annularly arranged such as to surround the motor shaft 121 and slidably fitted to the motor cylinders 122, and a motor swash plate 124 abutting against outer ends of these motor plungers 123, and the back side of the motor swash plate 124 is supported in the housing 111 through a thrust bearing 12S in a state inclined by a specific angle to the motor shaft 121.

The right and left pump shafts 114, 114 are coupled coaxially through a joint 138 in the narrow portion 102a. On the other hand, right and left motor shafts 121, 121 are disposed so as to be rotatable relatively and coaxially.

Figure 12:
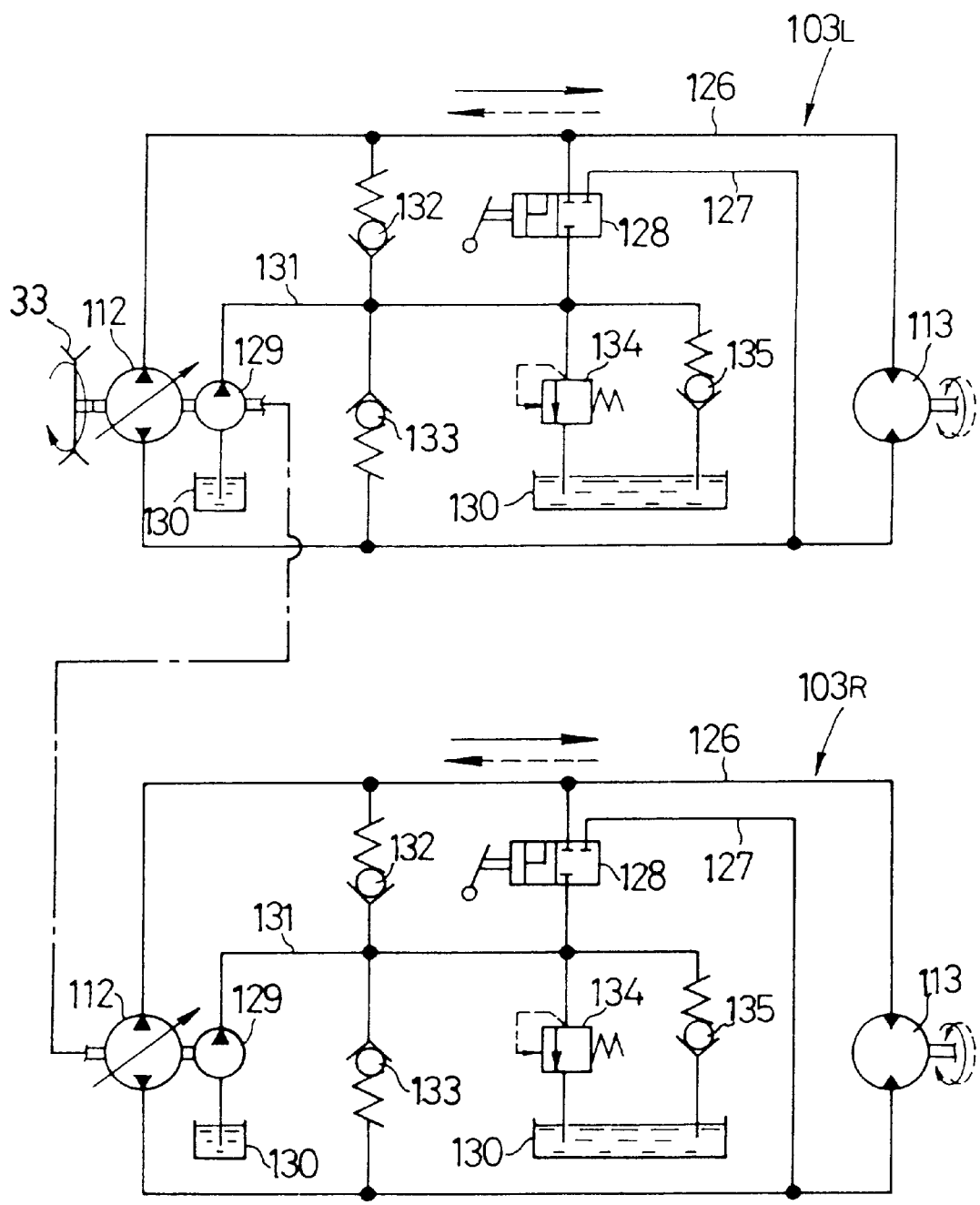
FIG. 12 is a hydraulic circuit diagram.
Figure 13:
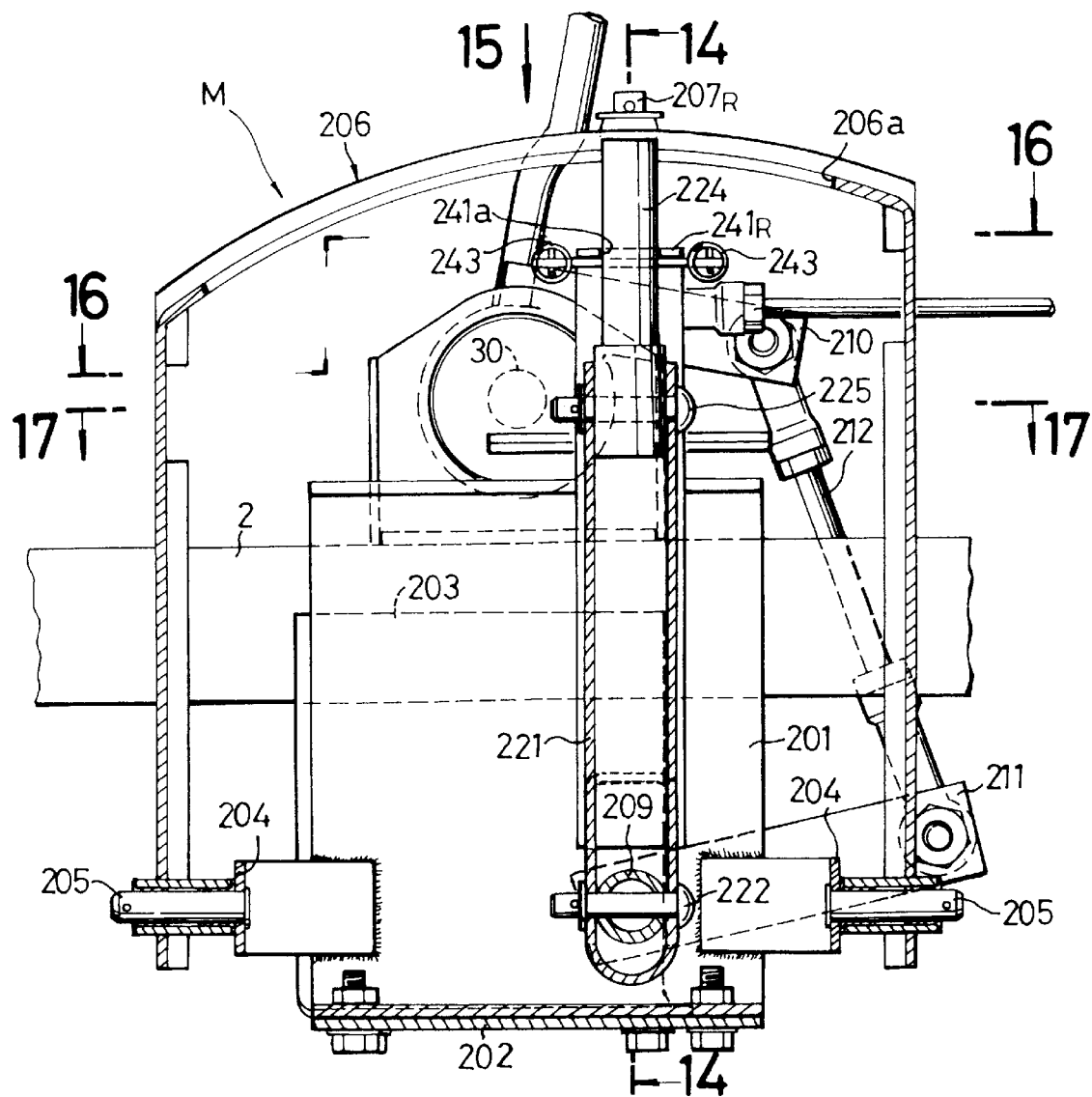
FIG. 13 is a magnified sectional view taken along a line 13—13 in FIG. 6.
Figure 14:
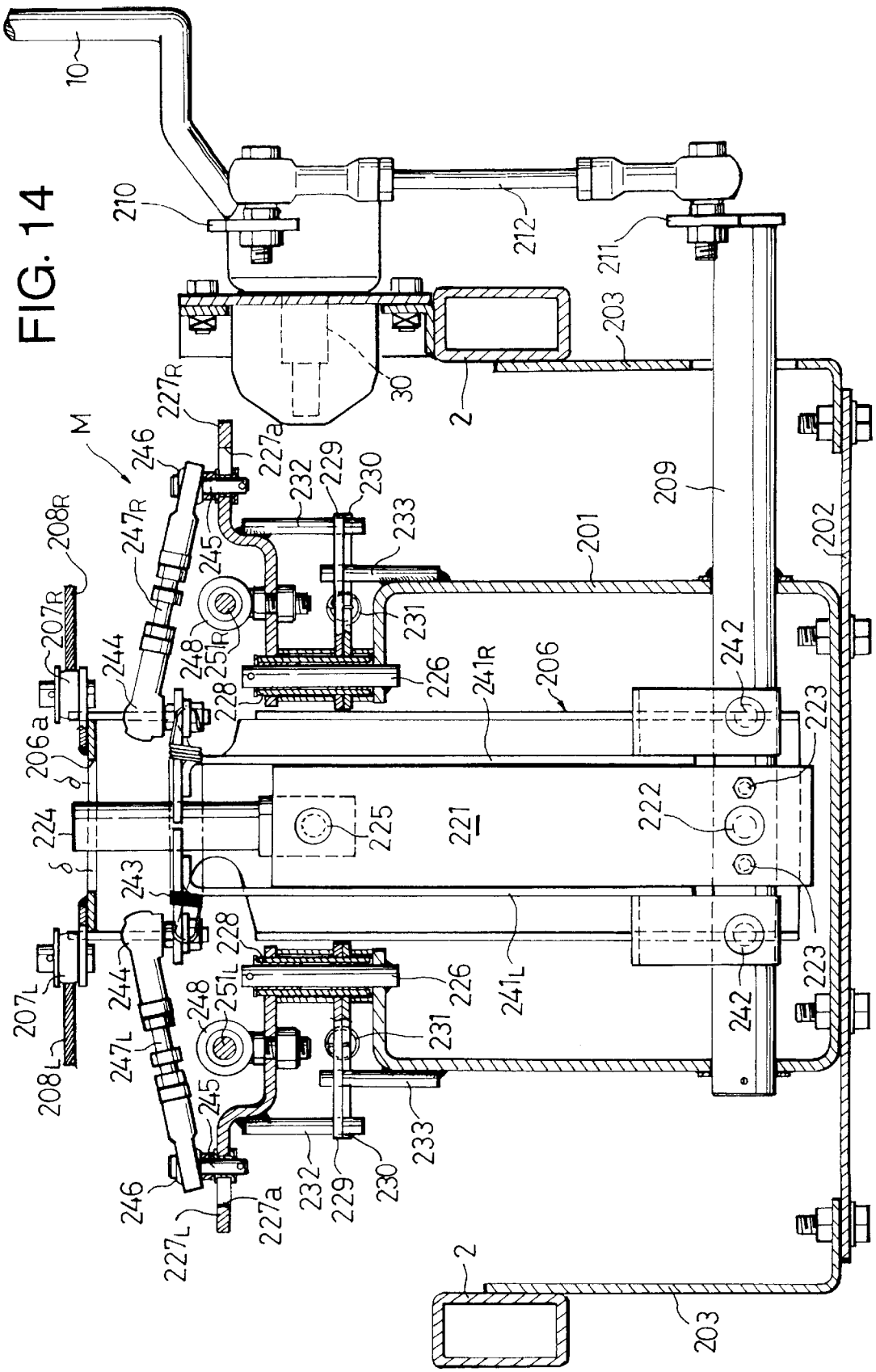
FIG. 14 is a sectional view taken along a line 14—14 in FIG. 13.
Figure 15:
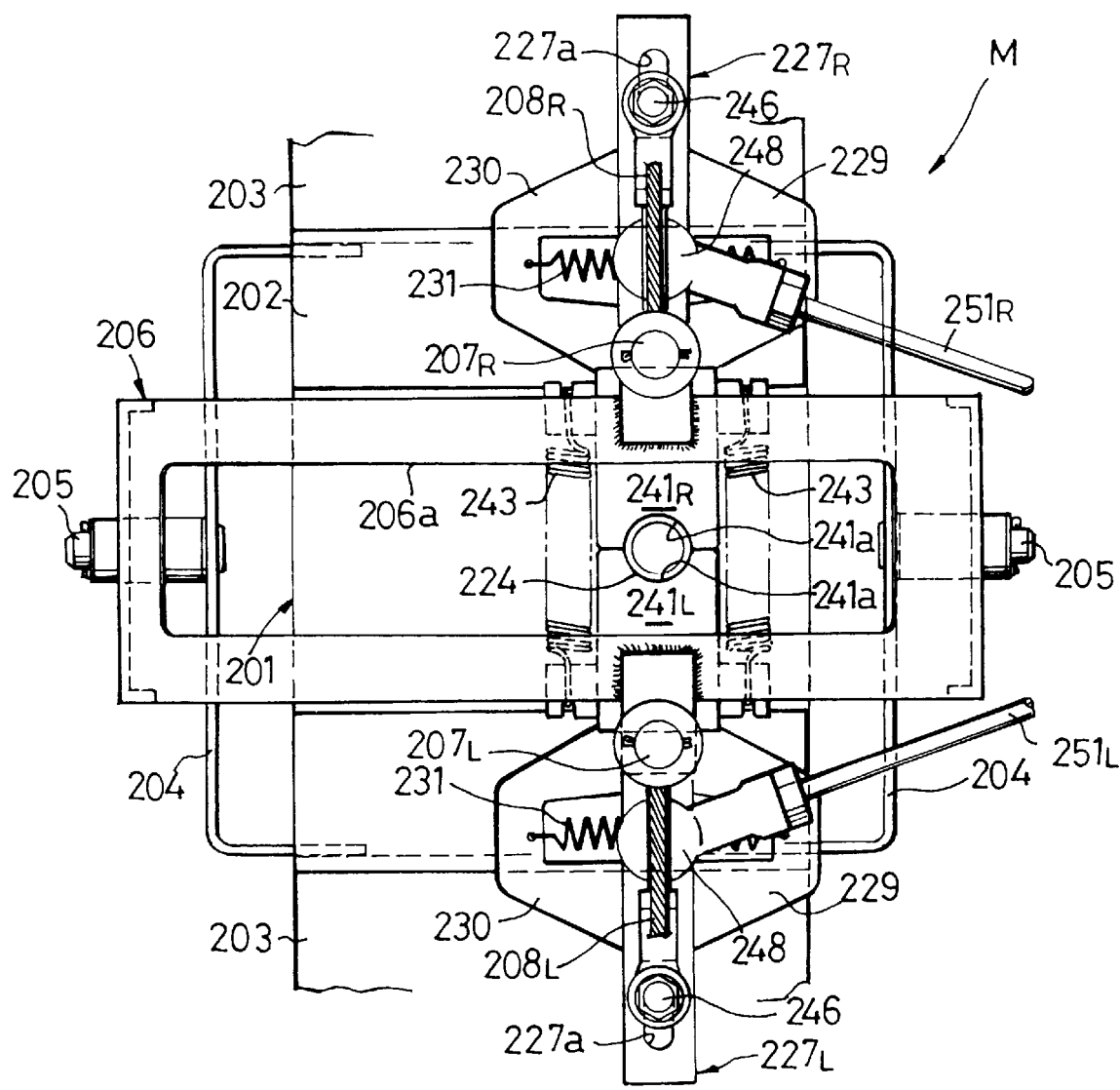
FIG. 15 is a view taken along an arrow 15 in FIG. 13.
Figure 16:
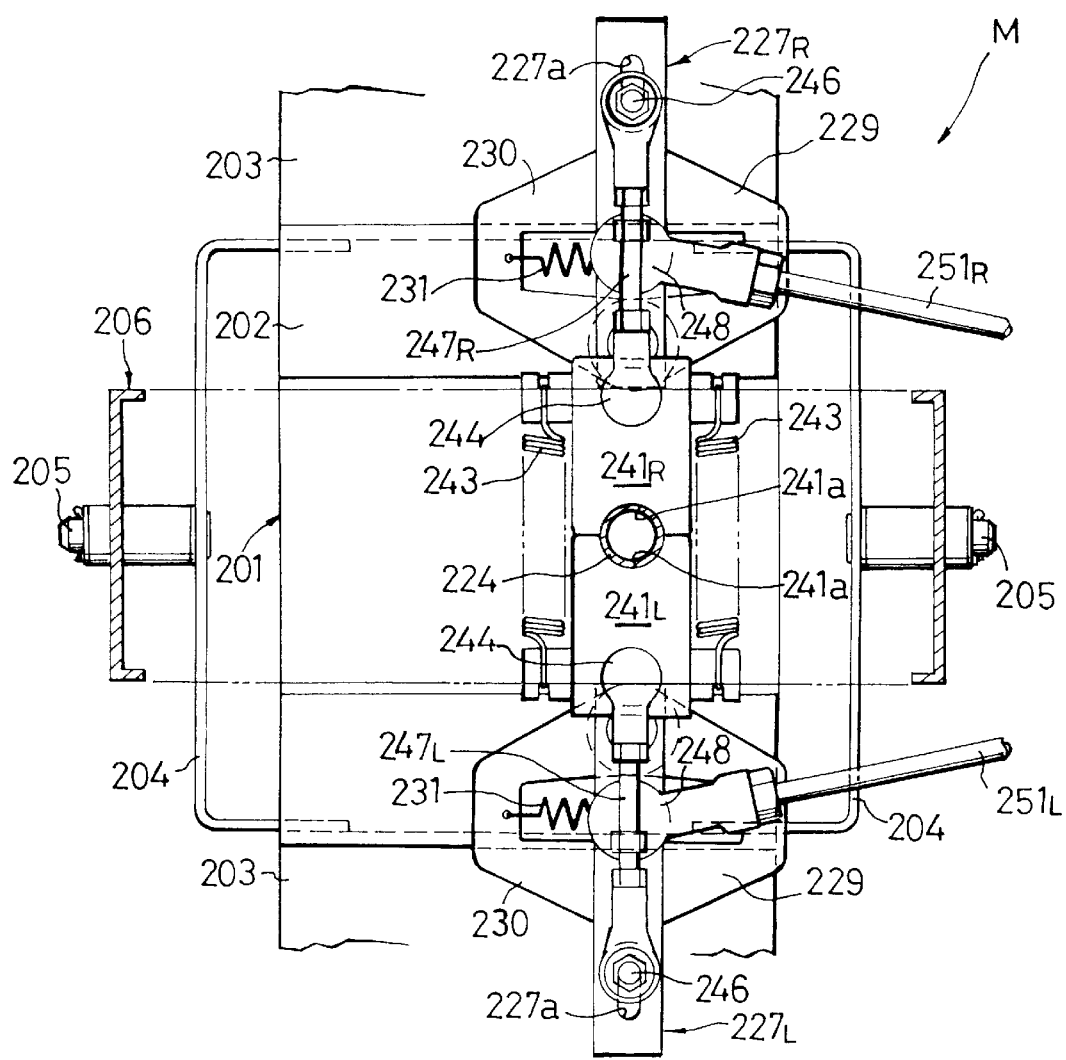
FIG. 16 is a sectional view taken along a line 16—16 in FIG. 13.
Figure 17:
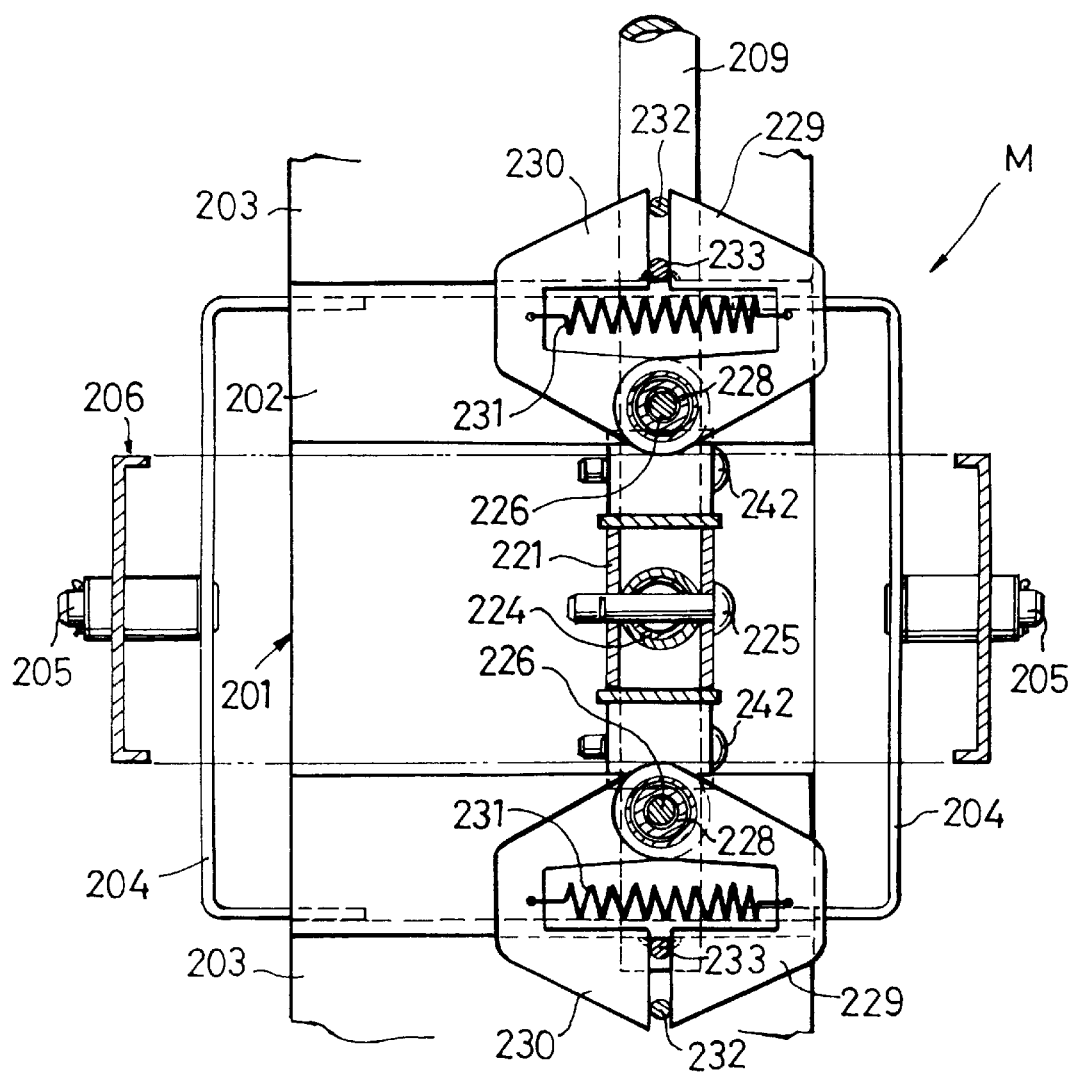
FIG. 17 is a sectional view taken along a line 17—17 in FIG. 13.

As shown in FIG. 12, in the hydrostatic pressure closed continuously variable transmissions $103_R$, $103_L$, the hydraulic pump 112 and hydraulic motor 113 are mutually connected through a hydraulic pressure closed circuit 126. In the hydraulic pressure closed circuit 126, a bypass passage 127 is provided for connecting between a high pressure side and a low pressure side of the circuit 126, and a release valve 128 opened and closed by manual operation is interposed. The hydraulic pump 112 is connected to a working oil supply pump 129 driven by the pump shaft 114. The working oil supply pump 129 is to pump up the working oil from an oil sump 130 to send it under pressure to an oil feed passage 131, and the oil feed passage 131 is connected to the high pressure side and low pressure side of the hydraulic pressure closed circuit 126 through one-way valves 132, 133, respectively. if necessary, the oil feed passage 131 may be connected to the oil sump 130 through relief valve 134 and suction valve 135 which are in mutual parallel relation.

When the release valve 128 is closed, if the hydraulic pump 112 is driven in a state where the pump swash plate 117 is inclined to the forward side, the working oil flows in the hydraulic pressure closed circuit 126 in the direction a solid line arrow. At that time, the motor shaft 121 of the hydraulic motor 113 rotates normally at the ratio of the diplacement of the hydraulic pump 112 and the displacement of the hydraulic motor 113 at this time as the speed change ratio. On the other hand, if the pump swash plate 117 is inclined to the reverse side, the working oil flows in the hydraulic pressure closed circuit 126 in the direction of a broken line arrow, so that the motor shaft 121 rotates reversely. At that time, if oil leak occurs in the hydraulic pressure closed circuit 126, one of the one-way valves 132 and 133 which corresponds to the low pressure side at this time opens, and the working oil is supplied from the working oil supply pump 129 into the hydraulic pressure closed circuit 126. If a pressure in the oil feed passage 131 is increased by a certain value, the relief valve 134 is opened so as to prevent a pressure in the oil feed passage 131 from excessively increasing. When the high pressure side and low pressure side are suddenly inverted in the hydraulic pressure closed circuit 126 due to an engine brake, if supply of the working oil to the low pressure side from the working oil supply pump 129 is insufficient, the suction valve 135 is opened, and the oil in the oil sump 130 is sucked into the low pressure side, thereby preventing air suction by the hydraulic pressure closed circuit 126.

In FIG. 9, the oil sump 130 is defined between both the case halves $102_R$, $102_L$ Of the transmission case 102. Inside of each distribution plate 110, there is an oil filter 136 immersed in the oil sump 130 through each suction port of the working oil supply pump 129 and suction valve 135, and the working oil to be supplied into the working oil supply pump 129 and suction valve 135 is filtered.

Figure 10:
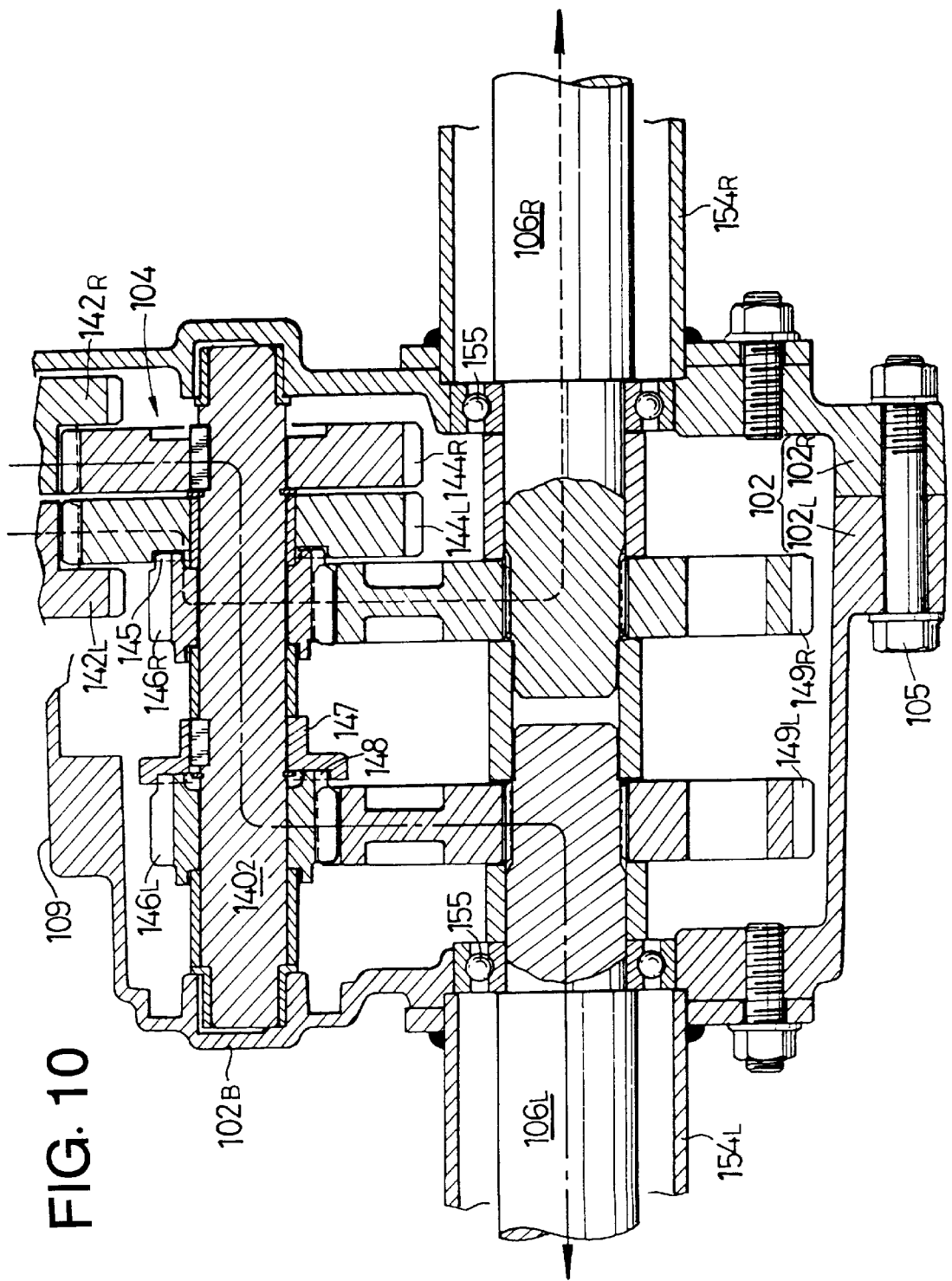
FIG. 10 is an enlarged view of an essential portion FIG. 8.

As shown in FIGS. 9 and 10, the speed reduction device 104 includes first and second intermediate shafts $140_1$, $140_2$ rotatably supported, in parallel to the axles $106_R$, $106_L$, on the narrow portion $102_A$ and wide portion $102_B$ of the transmission case 102, respectively, a pair of right and left first small gears $141_R$ $141_L$ secured to the inner ends of the right and left motors 121, 121, respectively, a pair of right and left first large gears $142_R$, $142_L$ engaged with the first gears $141_R$, $141_L$ and rotatably supported on the first intermediate shaft $140_1$, a pair of right and left second small gears $143_R$, $143_L$ formed integrally with opposed ends of the first large gears $142_R$, $142_L$, respectively, a right second large gear $144_R$ engaged with the right second gear $143_R$ coupled by key or spline to the right end of the second intermediate shaft $140_2$ facing the narrow portion $102_A$ of the second intermediate shaft, a left second large gear $144_L$ engaged with the left second gear $143_L$ and rotatably supported on the second intermediate shaft $140_2$ adjacent to the left side of the right second large gear $144_R$, a right final gear $146_R$ rotatably supported on the second intermediate shaft $140_2$ and coupled to the left end of the left second large gear $144_L$ through a dog clutch 145, a clutch body 147 coupled by key or spline with the second intermediate shaft $140_2$ at the left side of the right final gear $146_R$, a left final gear $146_L$ rotatably supported on the second intermediate shaft $140_2$ and coupled to the left end of the clutch body 147 through a dog clutch 148, and a pair of right and left final large gears $149_R$, $149_L$ spline-coupled with the right and left axles $106_R$, $106_L$ and engaged with the right and left final gears $146_R$, $146_L$, respectively. The driving force of the right side hydraulic motor 113 is transmitted to the left side axle $106_L$, and the driving force of the left side hydraulic motor 113 is transmitted to the right side axle $106_R$.

Figure 11:
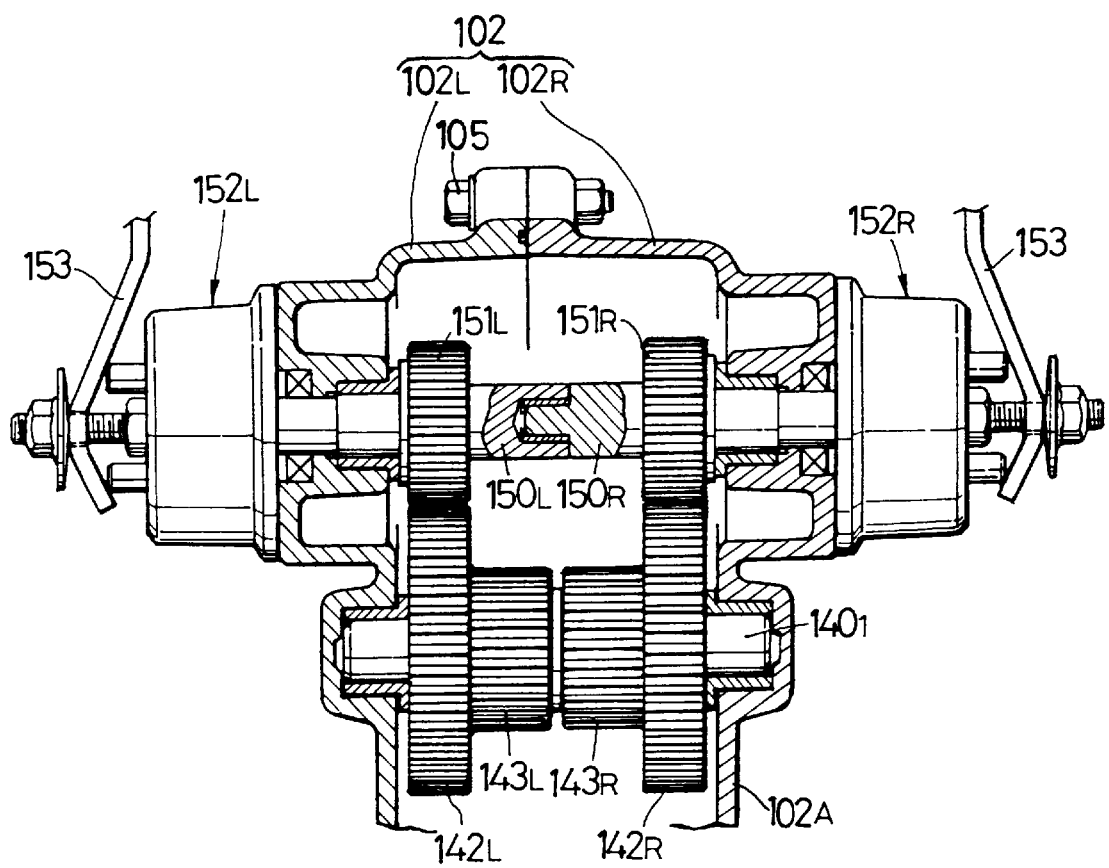
FIG. 11 is a sectional view taken along a line 11—11 in FIG. 7.

As shown in FIGS. 7 and 11, in the narrow portion $102_A$ of the transmission case 102, a pair of right and left brake shafts $150_R$, $150_L$ parallel to the first intermediate shaft $140_1$ and coaxial with each other are relatively rotatably supported, and these brake shafts $150_R$, $150_L$ are secured to a pair of brake gears $151_R$, $151_L$ to be engaged with the first large gears $142_R$, $142_L$ respectively. The right and left brake shafts $150_R$, $150_L$ are projected to the right and left sides of the narrow portion $102_A$, and are respectively provided with brake devices $152_R$, $152_L$ operated by a tension of a brake lever 153.

Instead of engaging gears $151_R$, $151_L$ with the first large gears $142_R$, $142_L$, the brake gears $151_R$, $151_L$ may be engaged with the second gears $144_R$, $144_L$.

As shown in FIGS. 4 and 6, one of the pump shafts 114 projects outward from the front part of the left case half $102_L$. An endless belt 34 is wound between a transmission drive pulley 32 provided on the crankshaft 11 of the engine E and a transmission driven pulley 33 provided in the one pump shaft 114. A tension pulley 38 is provided at a tip end of a tension pulley support arm 37 which is pivoted on a pivot 35 and biased by a spring 36. The tension pulley 38 abuts against the endless belt 34 to generate a predetermined tension.

In this way, the driving force of the engine E is distributed to the pump shafts 114, 114 of right and left hydrostatic pressure type continuously variable transmissions $103_R$, $103_L$ through the transmission drive pulley 32, the endless belt 34, and the transmission driven pulley 33, and such distributed driving forces are properly changed in speeds, and then, outputted to the speed reduction device 104 through corresponding motor shafts 121, 121. The driving force outputted to the speed reduction device 104 from the motor shaft 121 of the right side hydrostatic pressure type continuously variable transmission $103_R$ is transmitted to the left side axle $106_L$, whereas the driving force outputted to the speed reduction device 104 from the motor shaft 121 of the left side hydrostatic pressure type continuously variable transmission $103_L$ is transmitted to the right side axle $106_R$, so that the right and left rear wheels Wr are driven to travel the working vehicle 1.

In this case, in the right and left hydrostatic pressure type continuously variable transminssions $103_R$, $103_L$, if the both pump swash plates 117, 117 are tilted to the forward side, both motor shafts 121, 121 rotate normally, and the working vehicle 1 travels forward. And if both the pump smash plates 117, 117 are tilted to the reverse side, both the motor shafts 121, 121 rotate reversely, and the working vehicle 1 can travel backward. Moreover, by varying the speed change ratio of the right and left hydrostatic pressure type continuously variable transmissions $103_R$, $103_L$ such that the tilting angles of the right and left pump swash plates 117, 117 become different from each other, a difference is caused in the rotating speed of the right and left motor shafts 121, 121, so that the working vehicle 1 can turn.

The rotating speed of the engine B is variable, but it is fixed at 3300 RPM in an ordinary operating state.

AS clear from FIGS. 7 and 9, the transmission system T has a pair of right and left hydraulic motors 113, 113 disposed in the rear of the pair of right and left hydraulic pumps 112, 112, and the speed reduction device 104 is disposed in the rear of the hydraulic motors 113, 113. Therefore, the dimension in the vertical direction is extremely small, and moreover the transmission system T is mounted within a projection area of the rear wheels Wr as viewed on a side plane (see FIG. 1), and therefore stacking of the vehicle body can reliably be prevented while sufficiently maintaining the minimum height from the ground. Further, the position of center of gravity of the transmission system T is brought closed to the axles 106R, 106L to enhance the working stability, while the space near the axles 106R, 106L may be utilized effectively. Besides, since the vertical dimension of the transmission system T is small, the position of the engine E mounted in the upper part is lowered to lower the center of gravity of the vehicle body, so that the working stability is further enhanced.

Relating to FIGS. 1 to 6, a transmission of a power from the engine E to the rotary working machine R is described below.

A working machine-lifting/lowering shaft 62 extending in the lateral direction of the vehicle body is rotatably supported on a bracket 61 projecting backward from the rearmost cross frame $3_5$. A working machine drive pulley 63 provided on the crankshaft 11 of the engine E and a working machine driven pulley 64 provided on the working machine-lifting/lowering shaft 62 are connected through an endless belt 65, and a tension clutch C for controlling the tension of the endless belt 65 is connected to the clutch lever 9 pivoted.to the vehicle body front portion swingably in the longitudinal direction through a pivot 66.

That is, a transmission shaft 68 extending in the vertical direction is rotatably supported on a bracket 67 provided on the left side frame 2, and an arm 69 secured to this transmission shaft 68, and the lower end of the clutch lever 9 are connected through a link 70. A tension pulley 73 provided at one end of an L-shaped support arm 72 having the intermediate portion pivoted through a pivot 71 abuts against the endless belt 65, and the other end of the support arm 72 and other arm 60 secured to the transmission shaft 68 are connected with Bowden wire 75 through a buffer spring 74. The transmission shaft 68 is biased in the counterclockwise direction in FIG. 6 (that is, OFF direction of tension clutch C) by a return spring 76.

When the clutch lever 9 is pushed forward to turn on the tension clutch C, the transmission shaft 68 is turned in the clockwise direction from the OFF position to the ON position against the return spring 76 to pull the Bowden wire 75, and the support arm 72 oscillates, so that the tension pulley 73 is pushed to the endless belt 65. In this way, the tension clutch C is turned on, and the rotation of the crankshaft 11 of the engine E is transmitted to the working machine-lifting/lowering shaft 62. When the transmission shaft 68 turns from the OFF position to the ON position, it passes the neutral point, and therefore the transmission shaft 68 is stably held at the ON position by the tension of the buffer spring 74 through the Bowden wire 75. When the clutch lever 9 is pulled back to turn off the tension clutch C, the transmission shaft 68 is turned to the OFF position by the elastic force of the return spring 76, and is held there stably.

A rear chain case 79 is coupled through an intermediate case 78 to the rear end of a front chain case 77 pivoted on the working machine-lifting/lowering shaft 62 so as to be swingable vertically, and the rotary working machine R including the front chain case 77, intermediate case 78, and rear chain case 79 is driven vertically by a working machine elevating cylinder 80 attached to the bracket 61. That is, the first bracket 85 and second bracket 86 are pivoted on the working machine-lifting/lowering shaft 62 so as to be swingable vertically, and a first bracket 85 is coupled with the rear chain case 79 through a coupling member 87, and a second bracket 86 is connected to the working machine elevating cylinder 80. The second bracket 86 is opposed to the lower side of the first bracket 85, and when the second bracket 86 is swung vertically by the working machine elevating cylinder 80, the first bracket 85 pressed to the second bracket 86 oscillates upward together with the rotary working machine R. If the working machine elevating cylinder 80 does not operate, the rotary working machine R can oscillate freely upward about the working machine-lifting/lowering shaft 62 by the reaction from the ground.

A plurality of tilling blades 81 provided at the rear end of the rear chain case 79 are connected to the working machine-lifting/lowering shaft 62 by a chain transmission mechanism not shown accommodated in the front chain case 77, intermediate chain case 78, and rear chain case 79 and driven for rotation. Reference numeral 82 in the drawing denotes a cover for the tilling blades 81, 83 does a resistance rod, and 84 does a leveling plate.

As mentioned herein, the cylinder 12 of the engine E mounted on the rear part of the vehicle body frame F is directed upward and rearward, and the working machine-lifting/lowering shaft 62 is arranged in the lower space of the cylinder 12 of the engine B in side view, and therefore the waste space behind the vehicle body frame F can be effectively utilized. Moreover, the rotary working machine R can be brought closer to the vehicle body to decrease the moment transmitted from the rotary working machine R to the vehicle body to the utmost, which unnecessitates a reinforcement of the vehicle body so that the weight can be reduced. Still more, the followability of the rotary working machine R to the vehicle body is improved, and a tilling operation of a head land becomes easy and thus, non-tilled land decreases, and the stability of working vehicle 1 is enhanced.

As clear from FIG. 1, when the rotary working machine R reaches the chain line position which is the upward swing end, an upper end of the rotary working machine R is lower than an upper end of the engine E. Therefore, it is not only possible to enhance the stability by keeping low the position of center of gravity of the rotary working machine R, but also the rear visibility is improved because blocking of the vision of the driver seated on the seat 7 by the rotary working machine R is prevented. Still more, the space S between the rotary working machine R and engine E is widely kept, and the exhaust gas emitted from the exhaust $14M_1$ of the engine E is swiftly diffused to flow out backward and sideways, and the exhaust hardly flows to the driver side, and a comfortable working is realized.

Referring next to FIGS. 13 to 18, the structure of speed change operating device M for moving the working vehicle 1 back and forth, and turning right and left by mixing the operation of the steering wheel 8 and operation of change lever 10 is described in detail below. The speed change operating device M constitutes the steering characteristic changeover means of the invention.

The speed change operating device M has a base member 201 of a C-shaped section having right and left side walls and a bottom wall, with an upper surface opened. A support plate 202 superposed with the lower side of the base member 201 is suspended and supported by side frames 2, 2 by a pair of right and left stays 203, 203 in an L-form in front view. Pivots 205, 205 extending in the longitudinal direction are projected from a pair of brackets 204, 204 of a U-shape as viewed on a plane welded to front and rear portions of the base member 201. Front and rear lower ends of a guide member 206 in a reverse U form in side view are pivoted on these pivots 205, 205 so as to be swingable in the lateral direction.

A pair of Bowden wires $208_R$, $208_L$ coupled at one end to a pair of wire joints $207_R$, $207_L$ provided at the upper end of the guide oiember 206 are coupled at other end to the sector gear 24 (see FIG. 5) turned by the steering wheel 8. Therefore, by operating the steering wheel 8 to turn the working vehicle 1, the guide member 206 oscillates laterally about the pivots 205, 205 through the Bowden wires $208_R$, $208_L$.

In the lower part of the base member 201, a rotary shaft 209 extending in the lateral direction is rotatably supported. An arm 210 secured to the pivot 30 of the change lever 10 and an arm 211 secured to the right end of the rotary shaft 209 are coupled through a rod 212, and by swinging the change lever 10 back and forth, the rotary shaft 209 turns.

A first swing member 221 formed in a U form in side view is fitted to pinch the middle of the rotary shaft 209, and is pivoted so as to be free to oscillate laterally by a lower pivotal pin 222 penetrating through the rotary shaft 209. Two bolts 223, 223 penetrating through the rotary shaft 209 at right and left sides of the lower pivotal pin 222 are freely fitted to the first swing member 221. Therefore, the first swing member 221 can finely adjust the angle in the lateral direction about the lower pivotal pin 222 by the portion of the gap between the bolts 223, 223 and first swing member 221, and it can be fixed by tightening the bolts 223, 223.

At the upper end of the first swing member 221, the lower end of a mixing lever 224 is pivoted so as to be swingable laterally through an upper pivotal pin 225. The mixing lever 224 is freely fitted to a guide groove 206a formed in the longitudinal direction on the top of the guide member 206. Therefore, by operating the change lever 10, when the first swing member 221 is swung longitudinally together with the rotary shaft 209, the mixing lever 224 oscillates longitudinally along the guide groove 206a. By operating the steering wheel 8, when the guide member 206 is swung laterally about the pivots 205, 205, the mixing lever 224 abutting and pressed to the guide groove 206a oscillates laterally about the upper pivotal pin 225. At this time, by the gap δ (see FIG. 14) formed between the mixing lever 224 and guide groove 206a, the mixing lever 224 does not oscillate at the steering angle 0° to ±100° of the steering wheel 8, but oscillates at the steering angle of ±100° to ±200°.

On a pair of right and left pivots 226, 226 planted on the top of the base member 201, base ends of a pair of right and left control arms $227_R$, $227_L$ (speed change control member) are supported so as to be swingable longitudinally through collars 228, 228. On each pivot 226, upper and lower neutral plates 229, 230 are pivoted, and are biased in the mutually approaching direction by a neutral spring 231, and between the two neutral plates 229, 230, a neutral pin 232 fixed downward in the control arms $227_R$, $227_L$, and a neutral pin 233 fixed upward in the base member 201 are pinched. Therefore, the control arms $227_R$, $227_L$ are biased toward the neutral position, or the linearly extending position in the lateral direction.

On the other hand, at right and left sides of the first swing member 221, the lower ends of a pair of second swing members $241_R$, $241_L$ are pivoted on the rotary shaft 209 through pins 242, 242 so as to be swingable laterally. The pair of second swing members $241_R$, $241_L$ are biased in the mutually approaching direction by a pair of front and rear neutral thrusting springs 243, 243, and arc recesses 241a, 241a formed at their inner ends abut against the outer circumference of the mixing lever 224, and their confronting surface abuts against the right and left outer surfaces of the first swing member 221, so as to be stably held at the neutral position.

At the outer ends of the pair of second swing members $241_R$, $241_L$, corresponding inside ball joints 244, 244 are provided. At the front ends of the control arms $227_R$, $227_L$, slots 227a, 227a extending in the longitudinal direction of the control arms $227_R$, $227_L$ are formed, and outside ball joints 246, 246 are slidably supported in these slots 227a, 227a through pins 245, 245. The inside ball joints 244, 244 and outside ball joints 246, 246 are coupled with a pair of push-pull rods $247_R$, $241_L$ capable of adjusting the length in a turnbuckle system. When the mixing lever 224 is at the vertical neutral position, the push-pull rods $247_R$, $247_L$ are superposed on the control arms $227_R$, $227_L$, and the pins 245, 245 of the outside ball joints 246, 246 at this time abut against the inner ends of the slots 227a, 227a of the control arms $227_R$, $227_L$.

A pair of front ball joints 248, 248 provided in the middle of the right and left control arms $227_R$, $227_L$, and a pair of rear ball joints 250, 250 provided at the front end of the speed change arms $249_R$, $249_L$ secured to the upper end of a pair of trunnion shafts 120, 120 of the transmission system T are coupled with a pair of push-pull rods $251_R$, $251_L$ (link members) capable of adjusting the length in a turnbuckle system. Therefore, when the change lever 10 and steering wheel 8 are operated, in cooperation with the oscillation of the control arms $227_R$, $227_L$ of the speed change operating device M, the speed change arms $249_R$, $249_L$ of the transmission system e oscillate, thereby increasing or decreasing the rotating speed of the right and left rear wheels Wr.

As described herein, the speed change operating device M is disposed beneath the seat 7 provided in the middle in the longitudinal direction and lateral direction of the vehicle body, and the transmission system T is disposed closely behind the speed change operating device M, and the control arms $227_R$, $227_L$ of the speed change operating device M and the speed change arms $249_R$, $249_L$ for controlling the speed change ratio of the hydrostatic pressure type continuously variable transmissions $103_R$, $103_L$ of the transmission system T are connected through push-pull rods $251_R$, $251_L$ extending in the longitudinal direction of the vehicle body, and therefore, not only the waste space beneath the seat 7 can be effectively utilized, but also the balance of weight distribution and space distribution in the lateral direction of the vehicle body may be enhanced, and moreover the push-pull rods $251_R$, $251_L$ are kept to a minimum required length, so that formation of deflection and backlash may be prevented.

The action of the embodiment of the invention having such constitution is described below, When the right and left control arms $227_R$, $227_L$ are both moved forward from the neutral position, the rotating speed in the normal rotating direction of the right and left hydrostatic pressure type continuously variable transmissions $103_R$, $103_L$ increases, and the working vehicle 1 runs forward at a vehicle speed of 0 km/h to +7.5 km/h. When the right and left control arms $227_R$, $227_L$ are both moved backward from the neutral position, the rotating speed in the reverse rotating direction of the right and left hydrostatic pressure type continuously variable transmissions $103_R$, $103_L$ increases and the working vehicle 1 runs backward at a vehicle speed of 0 km/h to −3.5 km/h. When the working vehicle 1 turns, a difference is caused in the moving angle of the right and left control arms $227_R$, $227_L$ from the neutral position, and the speed of the inner wheel of the driven wheels during turning becomes smaller than the speed of the outer wheel of the driven wheels during turning. As a result, along with turning of the front wheel Wf by operation of the steering wheel 8, the working vehicle 1 is turned. Further, if only an outer wheel of the driven wheels during turning is driven and an inner driven wheel is stopped, the working vehicle 1 can be turned only by one driven wheel.

The relation between operation of the steering wheel 8 and change lever 10 and behavior of the working vehicle 1 is described below while referring to FIG. 18.

Figure 18:
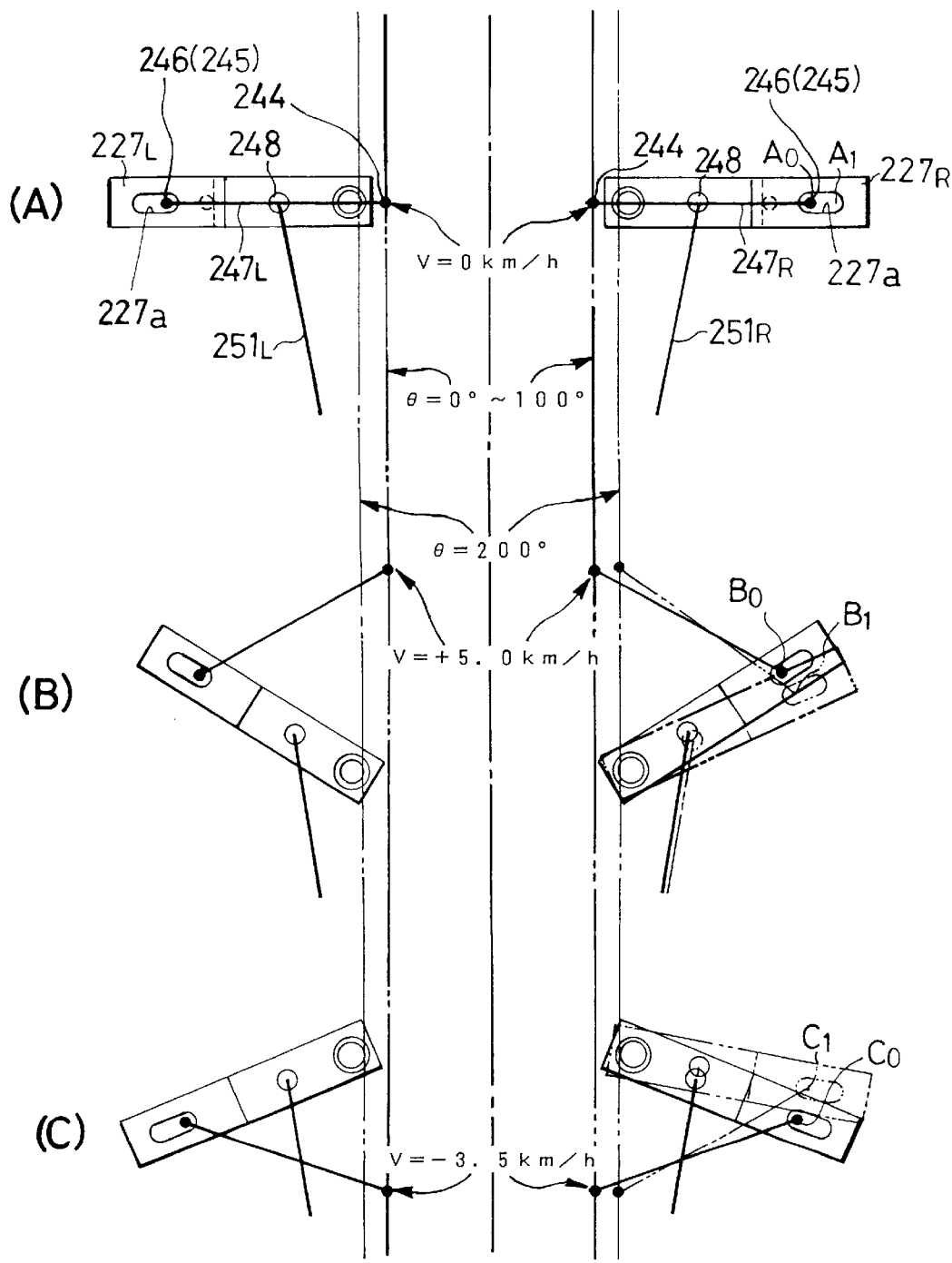
FIG. 18 is a view for explaining the operation.

When the change lever 10 is at the neutral position, the working vehicle 1 is stopped, and at this time the right and left push-pull rods $247_R$, $247_L$ overlap on the right and left control arms $227_R$, $227_L$ extending straightly in the lateral direction, and the pins 245, 245 of the outside ball joints 246, 246 provided at the front ends of the right and left push-pull rods $247_R$, $247_L$ are positioned at point $A_0$ at the inner end of the slots 227a, 227a of the right and left control arms $227_R$, $227_L$ (see FIG. 18 (A)).

At this time, when the steering wheel 8 is operated, for example, in left turning direction, the guide member 206 begins to oscillate to the right side around the pivots 205, 205. When the steering angle reaches 100°, the guide groove 206a of the guide member 206 abuts against the mixing lever 224, and the mixing lever 224 oscillates about the upper pivotal pin 225. As the mixing lever 224 oscillates in the right direction about the upper pivotal pin 225, the right second swing member $241_R$ begins to oscillate to the right side about the pin 242, resisting the neutral thrusting springs 243, 243. At this time, the left second swing member $241_L$ is held at the origin, abutting against the first swing member 221.

In this way, if the right second swing member $241_R$ is tilted to the right side and the right push-pull rod $247_R$ moves in the right direction, the outside ball joint 246 at its front end only slides within the slot 227a from point $A_0$ to point $A_1$ in FIG. 18 (A), so that the right control arm $227_R$ is held at the neutral position.

When the change lever 10 is moved forward from the neutral position in order to run forward the working vehicle 1, the rotary shaft 209 connected to the change lever 10 turns forward, and the right and left second swing members $241_R$, $241_L$ supported on this rotary shaft 209 also move forward. In consequence, the inside ball joints 244, 244 provided at the upper ends of the right and left second swing members $241_R$, $241_L$ move forward, and the outside ball joints 246, 246 connected to the inside ball joints 244, 244 through push-pull rods $247_R$, $247_L$ are pulled to the forward inner side.

As a result, the right and left control arms $227_R$, $227_L$ having the inner ends of slots $227a$, $227a$ pulled by the pins 245, 245 of the outside ball joints 246, 246 are moved forward by an equal angle, resisting the neutral springs 231, 231 (see FIG. 18 (B)). In this way, when the right and left control arms $227_R$, $227_L$ are moved forward to the same extent, the working vehicle 1 runs forward at a vehicle speed (for example, +5.0 km/h) corresponding to the moving extent.

At this time, when the steering wheel 8 is operated, for example, in left turning direction in a steering angle range of $\theta=100°$ to $200°$, the right push-pull rod $247_R$ moves to the right direction along with the oscillation of the second swing member $241_R$. Consequently, the outside ball joint 246 at the front end of the push-pull rod $247_R$ moves from point $B_0$ to point $B_1$ in FIG. 18 (B), and thereby the forward swing angle of the control arm $227_R$ decreases to the chain line position. Thus, the rotating speed of the motor shaft 121 of the right hydrostatic pressure type continuously variable transmission $103_R$ decreases, and the left rear wheel Wr slows down or stops, thereby making a smooth left turning.

When the change lever 10 is moved backward from the neutral position, the right and left control arms $227_R$, $227_L$ move backward symmetrically to the case of forward running, and the working vehicle 1 runs backward at a vehicle speed (for example, −3.5 km/h) corresponding to the reverse moving extent of the control arms $227_R$, $227_L$ (see FIG. 18 (C)).

In the case of reverse running, too, when the steering wheel 8 is operated in left turning direction in a steering angle range of $\theta=100°$ to $200°$, the outside ball joint 246 moves from point $C_0$ to point $C_1$ in FIG. 18 (C), and the reverse swing angle of the right control arm $227_R$ decreases to the chain line position, and the rotating speed of the motor shaft 121 of the right hydrostatic pressure type continuously variable transmission $103_R$ decreases, and the left rear wheel Wr slows down or stops, thereby making a smooth left turning.

Herein is explained the case of operating the steering wheel 8 in the left turning direction, and it is substantially the same when the steering wheel 8 is operated in the right turning direction. Meanwhile, by varying the length of the slots $227a$, $227a$ of the control arms $227_R$, $227_L$ the speed change characteristic in the case of operation of the steering wheel 8 can be easily adjusted.

As described so far, by the speed change operating device M of simple structure with high durability, the operation of steering wheel 8 and operation of change lever 10 can be mixed, and the transmission system T can be controlled. Moreover, if either steering wheel 8 or change lever 10 is operated, its operation does not interfere with the other, and the operation by the driver is simplified and the fatigue can be lessened.

In the case of straight running of the working vehicle 1 by moving the change lever 10 either forward or backward, incidentally, a difference may be caused in the rotating speed of the right and left rear. wheels Wr due to a slight difference in characteristics of the right and left hydraulic motors 113, 113, or right and left hydraulic pumps 112, 112, and the route of the working vehicle 1 may be shifted to right or left in spite of the intention of the driver. In such a case, the turning tendency of the working vehicle 1 may be corrected in the following manner.

That is, the working vehicle 1 is allowed to run with the bolts 223, 223 loosened, and in order that the working vehicle 1 may run straightly in this state, for example, the length of push-pull rods $251_R$, $251_L$ is adjusted finely. Then by tightening the bolts 223, 223 and fixing the first swing member 221 on the rotary shaft 209, thereafter the mixing lever 224 oscillates laterally about the upper pivotal pin 225.

Although the embodiment of the present invention has been described in detail, it will be understood that the present invention is not limited to the above-described embodiment, and various modifications in design may be made without departing from the spirit and scope of the invention defined in claims.

For example, although a rotary working machine has been exemplified as a working machine in the embodiment, the present invention can also be applied to any other type of working machine.

Further, although a four-wheel vehicle has been exemplified in the embodiment, the present invention can also be applied to a three-wheel vehicle having one front wheel or a vehicle including a crawler. Also, such vehicle can be of a truckle type in which a front wheel is not steered.

What is claimed is:

1. A working vehicle, comprising:
   a seat disposed substantially at a central portion of a vehicle frame;
   a working machine vertically movably disposed at a rear portion of said vehicle frame;
   an engine disposed between said seat and said working machine, wherein an upper end of said working machine when lifted to a highest position is set lower than an upper end of said engine;
   said working vehicle further comprising a transmission system mounted in said vehicle frame for transmitting a driving force of the engine to left and right driven wheels, said transmission system including a speed reduction device and a hydrostatic pressure type continuously variable transmission provided with a hydraulic pump and a hydraulic motor, said transmission system being disposed within a projection area of said driven wheels as viewed on a side plane,
   wherein said transmission system is provided with said hydraulic pump, said hydraulic motor and said speed reduction device sequentially from front to rear of the vehicle frame.

2. The working vehicle according to claim 1, wherein said engine is disposed at an upper portion of said transmission system.

3. The working vehicle according to claim 1, wherein said vehicle has a pair of rear wheels as said driven wheels, and said transmission system is operatively connected to said engine for transmitting the driving force from the engine to operate said working machine, said transmission system being disposed below said engine and at a lower portion of said vehicle frame, and wherein said engine is disposed between said pair of rear wheels.

4. A working vehicle, comprising:
   a seat disposed substantially at a central portion of a vehicle frame in both longitudinal and lateral directions;
   a working machine vertically movably disposed at a rear portion of said vehicle frame;
   an engine disposed between said seat and said working machine, wherein an upper end of said working machine when lifted to a highest position is set lower than an upper end of said engine;
   said working vehicle further comprising a transmission system including a hydrostatic pressure type continuously variable transmission; a speed change operating device for controlling speed change characteristics of said hydrostatic pressure type continuously variable transmission; a speed change control member provided in said speed change operating device; and another speed change control member provided in said transmission system, said speed change control members being connected together by a link member; said transmission system and said speed change operating device being mounted to said vehicle frame; wherein said speed change operating device is disposed in a lower portion of said seat, said transmission system is disposed in a rear of said speed change operating device at a position substantially centrally in the lateral direction of said vehicle frame, and said link member is disposed substantially along the longitudinal direction of said vehicle frame.

* * * * *